(12) United States Patent
Funk et al.

(10) Patent No.: US 9,771,446 B2
(45) Date of Patent: Sep. 26, 2017

(54) CONTROLLING THE PLACEMENT OF COMONOMER IN AN ETHYLENE COPOLYMER

(71) Applicant: NOVA Chemicals (International) S.A., Fribourg (CH)

(72) Inventors: Bradley Wade Funk, Calgary (CA); Peter Phung Minh Hoang, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 0 days.

(21) Appl. No.: 15/149,423

(22) Filed: May 9, 2016

(65) Prior Publication Data
US 2016/0340454 A1    Nov. 24, 2016

(30) Foreign Application Priority Data
May 21, 2015 (CA) ..................................... 2891693

(51) Int. Cl.
*C08F 4/44* (2006.01)
*C08F 4/06* (2006.01)
*C08F 210/00* (2006.01)
*C08F 210/16* (2006.01)
*C08F 2/34* (2006.01)

(52) U.S. Cl.
CPC .............. *C08F 210/16* (2013.01); *C08F 2/34* (2013.01)

(58) Field of Classification Search
CPC .. C08F 10/10; C08F 4/65912; C08F 2500/09; C08F 2500/10; C08F 210/16; C08F 2400/02

USPC ......................................... 526/161, 172, 348
See application file for complete search history.

(56) References Cited

U.S. PATENT DOCUMENTS

| | | | |
|---|---|---|---|
| 3,248,179 A | 4/1966 | Norwood | |
| 3,520,861 A * | 7/1970 | Thomson | ................ C08F 10/00 156/326 |
| 4,482,687 A | 11/1984 | Noshay et al. | |
| 4,543,399 A | 9/1985 | Jenkins, III et al. | |
| 4,588,790 A | 5/1986 | Jenkins, III et al. | |

(Continued)

FOREIGN PATENT DOCUMENTS

| | | |
|---|---|---|
| EP | 0 107 127 A1 | 5/1984 |
| EP | 0 811 638 A2 | 12/1997 |

OTHER PUBLICATIONS

Peri, J.B. and Hensley, A.L., Jr.; The surface Structure of Silica Gel; The Journal of Physical Chemistry; 70, vol. 72, No. 8, Aug. 1968; pp. 2926-2933.

(Continued)

*Primary Examiner* — William Cheung
(74) *Attorney, Agent, or Firm* — Julie L. Heinrich

(57) ABSTRACT

A process for controlling the placement of alpha olefins within an ethylene copolymer. The process involves polymerizing ethylene and an alpha olefin in the gas phase while changing the breadth of control over the molar ratio of ethylene to comonomer and/or hydrogen which is being fed to a polymerization reactor. At tighter control breadths, the alpha olefin may be incorporated mainly in the higher molecular weight portions of the ethylene copolymer. At looser control breadths, the alpha olefin may be incorporated more evenly throughout the ethylene copolymer or mainly in the lower molecular weight portions of the ethylene copolymer.

5 Claims, 6 Drawing Sheets

(56) References Cited

U.S. PATENT DOCUMENTS

| | | | |
|---|---|---|---|
| 4,613,484 A | 9/1986 | Ayres et al. |
| 4,701,432 A | 10/1987 | Welborn, Jr. |
| 4,808,561 A | 2/1989 | Welborn, Jr. |
| 4,935,397 A | 6/1990 | Chang |
| 4,937,301 A | 6/1990 | Chang |
| 5,026,795 A | 6/1991 | Hogan |
| 5,028,670 A | 7/1991 | Chinh et al. |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,283,278 A | 2/1994 | Daire et al. |
| 5,317,036 A | 5/1994 | Brady, III et al. |
| 5,324,800 A | 6/1994 | Welborn, Jr. et al. |
| 5,352,749 A | 10/1994 | DeChellis et al. |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,616,661 A | 4/1997 | Eisinger et al. |
| 5,633,394 A | 5/1997 | Welborn, Jr. et al. |
| 5,668,228 A | 9/1997 | Chinh et al. |
| 5,684,097 A | 11/1997 | Palmroos et al. |
| 5,703,187 A | 12/1997 | Timmers |
| 5,965,677 A | 10/1999 | Stephan et al. |
| 6,002,033 A | 12/1999 | Razavi et al. |
| 6,022,935 A | 2/2000 | Fischer et al. |
| 6,034,021 A | 3/2000 | Wilson et al. |
| 6,063,879 A | 5/2000 | Stephan et al. |
| 6,103,657 A | 8/2000 | Murray |
| 6,114,479 A | 9/2000 | Speca et al. |
| 6,124,230 A | 9/2000 | Speca et al. |
| 6,140,432 A | 10/2000 | Agapiou et al. |
| 6,235,672 B1 | 5/2001 | McKay et al. |
| 6,271,325 B1 | 8/2001 | McConville et al. |
| 6,274,684 B1 | 8/2001 | Loveday et al. |
| 6,277,931 B1 | 8/2001 | Jaber et al. |
| 6,300,436 B1 | 10/2001 | Agapiou et al. |
| 6,300,438 B1 | 10/2001 | McConville |
| 6,300,439 B1 | 10/2001 | McConville |
| 6,303,719 B1 | 10/2001 | Murray et al. |
| 6,306,984 B1 | 10/2001 | Agapiou et al. |
| 6,309,997 B1 | 10/2001 | Fujita et al. |
| 6,320,002 B1 | 11/2001 | Murray et al. |
| 6,342,463 B1 | 1/2002 | Stephan et al. |
| 6,372,864 B1 | 4/2002 | Brown |
| 6,391,819 B1 | 5/2002 | Agapiou et al. |
| 6,399,535 B1 | 6/2002 | Shih et al. |
| 6,399,724 B1 | 6/2002 | Matsui et al. |
| 6,417,304 B1 | 7/2002 | McConville et al. |
| 6,472,342 B2 | 10/2002 | Agapiou et al. |
| 6,489,413 B1 | 12/2002 | Floyd et al. |
| 6,559,090 B1 | 5/2003 | Shih et al. |
| 6,562,924 B2 | 5/2003 | Benazouzz et al. |
| 6,583,083 B2 | 6/2003 | Murray et al. |
| 6,593,266 B1 | 7/2003 | Matsui et al. |
| 6,608,153 B2 | 8/2003 | Agapiou et al. |
| 6,686,306 B2 | 2/2004 | Shih |
| 6,689,847 B2 | 2/2004 | Mawson et al. |
| 6,734,131 B2 | 5/2004 | Shih et al. |
| 6,770,723 B2 | 8/2004 | Fujita et al. |
| 6,777,509 B2 | 8/2004 | Brown et al. |
| 6,936,675 B2 | 8/2005 | Szul et al. |
| 6,958,375 B2 | 10/2005 | Shih et al. |
| 6,984,695 B2 | 1/2006 | Brown et al. |
| 7,157,531 B2 | 1/2007 | Szul et al. |
| 7,179,876 B2 | 2/2007 | Szul et al. |
| 7,354,880 B2 | 4/2008 | Agapiou et al. |
| 7,476,715 B2 | 1/2009 | McKay et al. |
| 7,531,602 B2 | 5/2009 | Hoang et al. |
| 8,227,552 B2 | 7/2012 | Kolb et al. |
| 8,497,329 B2 | 7/2013 | Kolb et al. |
| 8,809,473 B2 | 8/2014 | Hoang et al. |
| 2004/0233425 A1* | 11/2004 | Long ............... B01J 8/1809 356/301 |
| 2006/0189769 A1 | 8/2006 | Hoang et al. |
| 2014/0155561 A1 | 6/2014 | Ker et al. |

OTHER PUBLICATIONS

Brunauer, Stephen, Emmett, P.H. and Teller, Edward; Adsorption of Gases in Multimolecular Layers; Journal of the American Chemical Society, Feb. 1938, 60(2); pp. 309-319.

Clark, J.H., Macquarrie, D.J. and De Bruyn, M.; Catalysts, Supported; Kirk-Othmer Encyclopedia of Chemical Technology, 2001; published online Jul. 15, 2011, pp. 1-37.

Pangborn, Amy B., Tiardello, Michael A., Grubbs, Robert H.; Rosen, Robert K. and Timmers, Francis J.; Safe and Convenient Procedure for Solvent Purification; Organometallics, 1996, 15 (5), pp. 1518-1520.

ASTM D6474—99 (Reapproved 2006); Standard Test Method for Determining Molecular Weight Distribution and Molecular Weight Averages of Polyolefins by High Temperature Gel Permeation Chromatography; ASTM International; 2011; pp. 1-6.

ASTM D6645-01; Standard Test Method for Methyl (Comonomer) Content in Polyethylene by Infrared Spectrophotometry; ASTM International, 2012; pp. 1-4.

ASTM D1238-10; Standard Test Method for Melt Flow Rates of Thermoplastics by Extrusion Plastometer; ASTM International, 2011; pp. 1-15.

ASTM D792-13; Standard Test Methods for Density and Specific Gravity (Relative Density) of Plastics by Displacement, ASTM International, 2014, pp. 1-6.

\* cited by examiner

CONTROLLING THE PLACEMENT OF COMONOMER IN AN ETHYLENE COPOLYMER

The present disclosure provides an in-situ method of controlling the comonomer distribution profile of an ethylene copolymer made in the gas phase.

The short chain branching of an ethylene copolymer is thought to impact the overall properties of the resin and its performance in downstream applications such as for example blown film. The short chain branching in an ethylene copolymer corresponds to the placement of alpha-olefin units within the backbone of the polymer which otherwise dominated by a two carbon unit derived from ethylene. For example, when the alpha olefin is 1-butene, it will create an ethyl branch, when the alpha olefin is 1-hexene, it will create a butyl branch and so on. The amount and location of short chain branching within an ethylene copolymer is often determined using analytical techniques such as temperature rising elution fractionation (TREF) and gel-permeation chromatography with Fourier transform infra-red detection (GPC-FTIR).

The distribution of an alpha-olefin within an ethylene copolymer is often dictated by the type of polymerization catalyst employed to make it. However, various process methods have also been discovered which can further manipulate the final alpha-olefin placement even when a single polymerization catalyst is employed during the polymerization reaction. For example, U.S. Pat. Nos. 8,227,552 and 8,497,329 disclose that when a hafnocene type catalyst is employed in the gas phase polymerization of ethylene with 1-hexene, the distribution of the alpha-olefin can be altered by changing conditions such as the polymerization reaction temperature, the molar ratio of hydrogen to ethylene, the molar ratio of alpha-olefin to ethylene, and the partial pressure of ethylene. The effect of changing polymerization temperatures on the placement of alpha olefins in an ethylene copolymer made with a hafnocene catalyst has also been documented in U.S. Pat. Nos. 6,936,675 and 7,179,876. Similar changes have also been observed for hafnocene catalysts used under different levels of condensable hydrocarbon, see U.S. Pat. No. 7,157,531.

The applicant has previously discovered that the architecture of ethylene copolymers made with phosphinimine catalysts in the gas phase can be manipulated by changing the amount of catalyst modifier present in the catalyst system or fed to the polymerization reactor (see U.S. Pat. No. 8,809,473), as well as by changing the temperature of the polymerization process (see U.S. Patent Application Publication No. 2014/0155561 A1).

U.S. Patent Application Publication No. 2006/0189769 A1 discloses that cycling the ratio of hydrogen to ethylene from high to low values during polymerization of ethylene and alpha olefins with a phosphinimine catalyst allows one to control the molecular weight distribution of the resulting polymer. However, little change in the corresponding comonomer distribution was observed.

Although, incorporation of comonomers into the higher molecular weight portions of an ethylene polymer is thought to be advantageous, there remains a need for ethylene copolymers made from single site catalysts which have a normal or flat comonomer distribution profile.

We have now found a method that, in some embodiments, alters the comonomer distribution in situ. In some embodiments, the method does not involve changing the ratio of comonomer or hydrogen to ethylene per se, but instead, either allows or prevents the comonomer or hydrogen to ethylene ratio to drift around a targeted average comonomer or hydrogen to ethylene ratio. In some embodiments, the method allows for the in situ control of the placement of short chain branching within an ethylene copolymer, including moving from a reversed comonomer distribution to a relatively flat, or even normal comonomer distribution.

In some embodiments, the present disclosure provides a method to control the placement of a comonomer within an ethylene copolymer.

By deliberately inducing the ratio of comonomer to ethylene to fluctuate around a target average ratio, the placement of comonomer at lower molecular weights becomes favorable. Conversely, by not allowing or deliberately inducing the ratio of comonomer to ethylene to fluctuate beyond a minimum amount around a target average ratio, the placement of comonomer at higher molecular weights becomes favorable.

In some embodiments, provided herein are methods of controlling the placement of comonomer in an ethylene copolymer, the method comprising polymerizing ethylene (C2) and one or more comonomers (Cx) at an average Cx/C2 molar ratio with a single site catalyst system in a gas phase reactor and deliberately changing the variability of the Cx/C2 molar ratio within the gas phase reactor wherein the variability is measured as the percent standard deviation in the Cx/C2 molar ratio from the average Cx/C2 molar ratio.

THE POLYMERIZATION CATALYST SYSTEM

Figure 1:
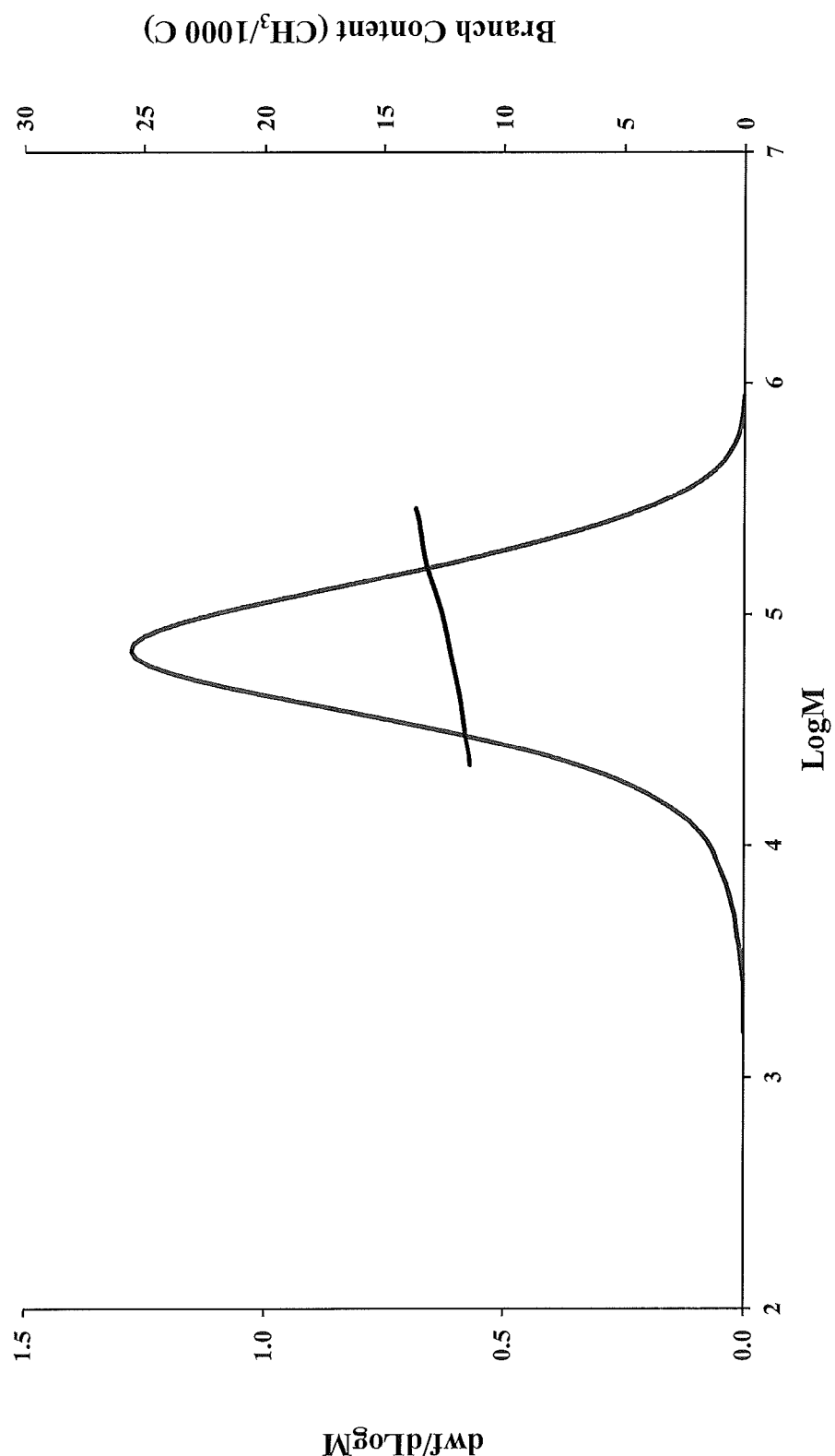
FIG. 1 shows a gel permeation chromatograph with Fourier transform infra-red (GPC-FTIR) detection obtained for an ethylene copolymer made according to an embodiment of the present disclosure. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the figure, the number of short chain branches increases at higher molecular weights, and hence the comonomer incorporation is said to be "reversed".

A polymerization catalyst system must comprise a polymerization active catalyst component (the "polymerization catalyst"), but may also comprise other components such as but not limited to a catalyst activator (also known as a cocatalyst), a continuity additive (also known as a "catalyst modifier"), and an inert support. A polymerization catalyst system comprising a single site catalyst as the polymerization active component is herein referred to as a "single site catalyst system".

The Single Site Polymerization Catalyst

The polymerization catalysts usefully employed in the present disclosure are single site catalysts. Suitable single site catalysts are metallocene catalysts, constrained geometry catalysts and phosphinimine catalysts all of which are polymerization active organometallic compounds well known to persons skilled in the relevant art. Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413. Some non-limiting examples of constrained geometry catalysts can be found in U.S. Pat. Nos. 5,057,475; 5,096,867; 5,064,802; 5,132,380; 5,703,187 and 6,034,021. Some non-limiting examples of phosphinimine catalysts can be found in U.S. Pat. Nos. 6,342,463; 6,235,672; 6,372,864; 6,984,695; 6,063,879; 6,777,509 and 6,277,931. Other single site catalysts known in the art may also be used in the process of the present disclosure (e.g., catalysts comprising phenoxyimine and similar closely related ligands such as those described in U.S. Pat. Nos. 6,309,997; 6,399,724; 6,770,723 and 6,593,266; and catalysts comprising bidentate or tridentate ligands having a group 15 atom such as those described in U.S. Pat. Nos. 6,274,684; 6,689,847; 6,583,083; 6,300,438; 6,417,304; 6,300,439; 6,271,325; 6,320,002; 6,303,719; and 6,103,657).

In some embodiments, the single site catalyst is based on a group 3, 4 or 5 metal (where the numbers refer to columns in the Periodic Table of the Elements using IUPAC nomenclature). In some embodiments, single site catalysts are based on metals from group 4, which includes titanium, hafnium and zirconium. In some embodiments, preferred single site catalysts are group 4 metal complexes in their highest oxidation state.

The single site catalysts described herein, usually require activation by one or more cocatalytic or activator species in order to provide polymer. Hence, single site catalysts are sometimes called "pre-catalysts".

Also suitable for use in the present disclosure are phosphinimine catalysts which are further described below.

In some embodiments, the phosphinimine catalyst is based on metals from group 4, which includes titanium, hafnium and zirconium. In some embodiments, the preferred phosphinimine catalysts are group 4 metal complexes in their highest oxidation state.

The phosphinimine catalysts described herein, usually require activation by one or more cocatalytic or activator species in order to provide polymer from olefins.

A phosphinimine catalyst is a compound (typically an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts".

In an embodiment of the disclosure, a phosphinimine catalyst is defined by the formula: $(L)_n(Pl)_mMX_p$ where M is a transition metal selected from Ti, Hf, Zr; Pl is a phosphinimine ligand; L is a cyclopentadienyl-type ligand; X is an activatable ligand; m is 1 or 2; n is 0 or 1; and p is determined by the valency of the metal M. In some embodiments m is 1, n is 1 and p is 2.

In an embodiment of the disclosure, a phosphinimine catalyst is defined by the formula: $(L)(Pl)MX_2$ where M is a transition metal selected from Ti, Hf, Zr; Pl is a phosphinimine ligand; L is a cyclopentadienyl-type ligand; and X is an activatable ligand.

The phosphinimine ligand is defined by the formula: $R_3P=N—$, where N bonds to the metal, and wherein each R is independently selected from a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical (the aryl or aryloxy radical optionally being unsubstituted or further substituted by one or more halogen atom and/or $C_{1-20}$ alkyl radical); amido radical; silyl radical of the formula: $—SiR'_3$ wherein each R' is independently selected from hydrogen, a $C_{1-8}$ alkyl or alkoxy radical, $C_{6-10}$ aryl or aryloxy radicals; and germanyl radical of the formula: $—GeR'_3$ wherein R' is as defined above.

In an embodiment of the disclosure the phosphinimine ligand is chosen so that each R is a hydrocarbyl radical. In a particular embodiment of the disclosure, the phosphinimine ligand is tri-(tertiarybutyl)phosphinimine (i.e., where each R is a tertiary butyl group, or "t-Bu" for short).

In an embodiment of the disclosure, the phosphinimine catalyst is a group 4 compound/complex which contains one phosphinimine ligand (as described above) and one ligand L which is a cyclopentadienyl-type ligand.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from a $C_{1\text{-}30}$ hydrocarbyl radical (which hydrocarbyl radical may be unsubstituted or further substituted by for example a halide and/or a hydrocarbyl group; for example a suitable substituted $C_{1\text{-}30}$ hydrocarbyl radical is a pentafluorobenzyl group such as —$CH_2C_6F_5$); a halogen atom; a $C_{1\text{-}8}$ alkoxy radical; a $C_{6\text{-}10}$ aryl or aryloxy radical (each of which may be further substituted by for example a halide and/or a hydrocarbyl group; for example a suitable $C_{6\text{-}10}$ aryl group is a perfluoroaryl group such as —$C_6F_5$); an amido radical which is unsubstituted or substituted by up to two $C_{1\text{-}8}$ alkyl radicals; a phosphido radical which is unsubstituted or substituted by up to two $C_{1\text{-}8}$ alkyl radicals; a silyl radical of the formula —$Si(R')_3$ wherein each R' is independently selected from hydrogen, a $C_{1\text{-}8}$ alkyl or alkoxy radical, $C_{6\text{-}10}$ aryl or aryloxy radicals; and a germanyl radical of the formula —$Ge(R')_3$ wherein R' is as defined directly above.

The term "activatable ligand" refers to a ligand which may be activated by a cocatalyst (also referred to as an "activator"), to facilitate olefin polymerization. An activatable ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g., a halide may be converted to an alkyl group). Without wishing to be bound by any single theory, protonolysis or abstraction reactions generate an active "cationic" metal center which can polymerize olefins. In embodiments of the present disclosure, the activatable ligand, X is independently selected from a hydrogen atom; a halogen atom; a $C_{1\text{-}10}$ hydrocarbyl radical; a $C_{1\text{-}10}$ alkoxy radical; a $C_{6\text{-}10}$ aryl oxide radical, each of which said hydrocarbyl, alkoxy, and aryl oxide radicals may be unsubstituted by or further substituted by a halogen atom, a $C_{1\text{-}8}$ alkyl radical, a $C_{1\text{-}8}$ alkoxy radical, a $C_{6\text{-}10}$ aryl or aryloxy radical; an amido radical which is unsubstituted or substituted by up to two $C_{1\text{-}8}$ alkyl radicals; and a phosphido radical which is unsubstituted or substituted by up to two $C_{1\text{-}8}$ alkyl radicals. Two activatable X ligands may also be joined to one another and form for example, a substituted or unsubstituted diene ligand (i.e., 1,3-diene); or a delocalized heteroatom containing group such as an acetate group.

The number of activatable ligands depends upon the valency of the metal and the valency of the activatable ligand. In some embodiments, the preferred phosphinimine catalysts are based on group 4 metals in their highest oxidation state (i.e., 4+). Particularly suitable activatable ligands are monoanionic such as a halide (e.g., chloride) or a hydrocarbyl (e.g., methyl, benzyl).

In some instances, the metal of the phosphinimine catalyst may not be in the highest oxidation state. For example, a titanium (III) component would contain only one activatable ligand.

In an embodiment of the disclosure, the phosphinimine catalyst has the formula, $(L)(Pl)MX_2$, where M is Ti, Zr or Hf; Pl is a phosphinimine ligand having the formula $R_3P\!=\!N\!-\!$, where R is independently selected from hydrogen, halogen, and $C_1\text{-}C_{20}$ hydrocarbyl; L is a ligand selected from cyclopentadienyl, substituted cyclopentadienyl, indenyl, substituted indenyl, fluorenyl, and substituted fluorenyl; and X is an activatable ligand.

In an embodiment of the disclosure, the phosphinimine catalyst has the formula: $(L)((t\text{-}Bu)_3P\!=\!N)TiX_2$, where L is a ligand selected from cyclopentadienyl, substituted cyclopentadienyl, indenyl, and substituted indenyl; and X is an activatable ligand.

In an embodiment of the disclosure, the phosphinimine catalyst has the formula: $(L)((t\text{-}Bu)_3P\!=\!N)TiX_2$, where L is a ligand selected from a substituted cyclopentadienyl and substituted indenyl; and X is an activatable ligand.

In an embodiment of the disclosure, the phosphinimine catalyst contains a phosphinimine ligand, a cyclopentadienyl ligand ("Cp" for short) and two chloride or two methyl ligands bonded to the group 4 metal.

In an embodiment of the disclosure, the phosphinimine catalyst contains a phosphinimine ligand, a singly or multiply substituted cyclopentadienyl ligand and two chloride or two methyl ligands bonded to the group 4 metal.

In an embodiment of the disclosure, the phosphinimine catalyst contains a phosphinimine ligand, a perfluoroaryl substituted cyclopentadienyl ligand and two chloride or two methyl ligands bonded to the group 4 metal.

In an embodiment of the disclosure, the phosphinimine catalyst contains a phosphinimine ligand, a perfluorophenyl substituted cyclopentadienyl ligand (i.e., Cp-$C_6F_5$) and two chloride or two methyl ligands bonded to the group 4 metal.

In an embodiment of the disclosure, the phosphinimine catalyst contains a 1,2-substituted cyclopentadienyl ligand and a phosphinimine ligand which is substituted by three tertiary butyl substituents.

In an embodiment of the disclosure, the phosphinimine catalyst contains a 1,2 substituted cyclopentadienyl ligand (e.g., a 1,2-(R*)(Ar—F)Cp) where the substituents are selected from R* a hydrocarbyl group, and Ar—F a perfluorinated aryl group, a 2,6 (i.e., ortho) fluoro substituted phenyl group, a 2,4,6 (i.e., ortho/para) fluoro substituted phenyl group, or a 2,3,5,6 (i.e., ortho/meta) fluoro substituted phenyl group respectively.

In the present disclosure, 1,2 substituted cyclopentadienyl ligands such as for example 1,2-(R*)(Ar—F)Cp ligands may contain as impurities 1,3 substituted analogues such as for example 1,3-(R*)(Ar—F)Cp ligands. Hence, phosphinimine catalysts having a 1,2 substituted Cp ligand may contain as an impurity, a phosphinimine catalyst having a 1,3 substituted Cp ligand. Alternatively, the current disclosure contemplates the use of 1,3 substituted Cp ligands as well as the use of mixtures of varying amounts of 1,2 and 1,3 substituted Cp ligands to give phosphinimine catalysts having 1,3 substituted Cp ligands or mixed phosphinimine catalysts having 1,2 and 1,3 substituted Cp ligands.

In an embodiment of the disclosure, the phosphinimine catalyst has the formula: $(1,2\text{-}(R*)(Ar\text{—}F)Cp)M(N\!=\!P(t\text{-}Bu)_3)X_2$ where R* is a hydrocarbyl group; Ar—F is a perfluorinated aryl group, a 2,6 (i.e., ortho) fluoro substituted phenyl group, a 2,4,6 (i.e., ortho/para) fluoro substituted phenyl group, or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: $(1,2\text{-}(R*)(Ar\text{—}F)Cp)M(N\!=\!P(t\text{-}Bu)_3)X_2$ where R* is an alkyl group; Ar—F is a perfluorinated aryl group, a 2,6 (i.e., ortho) fluoro substituted phenyl group, a 2,4,6 (i.e., ortho/para) fluoro substituted phenyl group or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: $(1,2\text{-}(R^*)(Ar\text{—}F)Cp)M(N\!\!=\!\!P(t\text{-}Bu)_3)X_2$ where $R^*$ is a hydrocarbyl group having from 1 to 20 carbons; Ar—F is a perfluorinated aryl group; M is Ti, Zr or Hf; and X is an activatable ligand. In an embodiment of the disclosure, the phosphinimine catalyst has the formula: $(1,2\text{-}(R^*)(Ar\text{—}F)Cp)M(N\!\!=\!\!P(t\text{-}Bu)_3)X_2$ where $R^*$ is a straight chain alkyl group; Ar—F is a perfluorinated aryl group, a 2,6 (i.e., ortho) fluoro substituted phenyl group, a 2,4,6 (i.e., ortho/para) fluoro substituted phenyl group, or a 2,3,5,6 (i.e., ortho/meta) fluoro substituted phenyl group; M is Ti, Zr or Hf; and X is an activatable ligand. In an embodiment of the disclosure, the phosphinimine catalyst has the formula: $(1,2\text{-}(n\text{-}R^*)(Ar\text{—}F)Cp)Ti(N\!\!=\!\!P(t\text{-}Bu)_3)X_2$ where $R^*$ is a straight chain alkyl group; Ar—F is a perfluorinated aryl group; M is Ti, Zr or Hf; and X is an activatable ligand. In an embodiment of the disclosure, the phosphinimine catalyst has the formula: $(1,2\text{-}(R^*)(C_6F_5)Cp)M(N\!\!=\!\!P(t\text{-}Bu)_3)X_2$ where $R^*$ is a hydrocarbyl group having 1 to 20 carbon atoms; M is Ti, Zr or Hf; and X is an activatable ligand. In an embodiment of the disclosure, the phosphinimine catalyst has the formula: $(1,2\text{-}(n\text{-}R^*)(C_6F_5)Cp)M(N\!\!=\!\!P(t\text{-}Bu)_3)X_2$ where $R^*$ is a straight chain alkyl group; M is Ti, Zr or Hf; and X is an activatable ligand. In further embodiments, M is Ti and $R^*$ is any one of a methyl, ethyl, n-propyl, n-butyl, n-pentyl, n-hexyl, n-heptyl, and n-octyl group. In further embodiments, X is chloride or methide.

The term "perfluorinated aryl group" means that each hydrogen atom attached to a carbon atom in an aryl group has been replaced with a fluorine atom as is well understood in the art (e.g., a perfluorinated phenyl group or substituent has the formula $—C_6F_5$). In embodiments of the disclosure, Ar—F is selected from the group comprising perfluorinated phenyl or perfluorinated naphthyl groups.

Some phosphinimine catalysts which may be used in the present disclosure include: $((C_6F_5)Cp)Ti(N\!\!=\!\!P(t\text{-}Bu)_3)Cl_2$; $(1,2\text{-}(n\text{-}propyl)(C_6F_5)Cp)Ti(N\!\!=\!\!P(t\text{-}Bu)_3)Cl_2$, $(1,2\text{-}(n\text{-}butyl)(C_6F_5)Cp)Ti(N\!\!=\!\!P(t\text{-}Bu)_3)Cl_2$ and $(1,2\text{-}(n\text{-}hexyl)(C_6F_5)Cp)Ti(N\!\!=\!\!P(t\text{-}Bu)_3)Cl_2$.

In an embodiment of the disclosure, the phosphinimine catalyst will have a single or multiply substituted indenyl ligand and a phosphinimine ligand which is substituted by three tertiary butyl substituents.

An indenyl ligand (or "Ind" for short) as defined in the present disclosure will have framework carbon atoms with the numbering scheme provided below, so the location of a substituent can be readily identified.

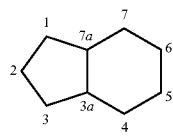

In an embodiment of the disclosure, the phosphinimine catalyst will have a singly substituted indenyl ligand and a phosphinimine ligand which is substituted by three tertiary butyl substituents.

In an embodiment of the disclosure, the phosphinimine catalyst will have a singly or multiply substituted indenyl ligand where the substituent is selected from a substituted or unsubstituted alkyl group, a substituted or an unsubstituted aryl group, and a substituted or unsubstituted benzyl (e.g., $C_6H_5CH_2$—) group. Suitable substituents for the alkyl, aryl or benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have a singly substituted indenyl ligand, $R^\yen$-Indenyl, where the $R^\yen$ substituent is a substituted or unsubstituted alkyl group, a substituted or an unsubstituted aryl group, or a substituted or unsubstituted benzyl group. Suitable substituents for an $R^\yen$ alkyl, $R^\yen$ aryl or $R^\yen$ benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have an indenyl ligand having at least a 1-position substituent (1-$R^\yen$) where the substituent $R^\yen$ is a substituted or unsubstituted alkyl group, a substituted or an unsubstituted aryl group, or a substituted or unsubstituted benzyl group. Suitable substituents for an $R^\yen$ alkyl, $R^\yen$ aryl or $R^\yen$ benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have a singly substituted indenyl ligand, 1-$R^\yen$-Indenyl where the substituent $R^\yen$ is in the 1-position of the indenyl ligand and is a substituted or unsubstituted alkyl group, a substituted or unsubstituted aryl group, or a substituted or an unsubstituted benzyl group. Suitable substituents for an $R^\yen$ alkyl, $R^\yen$ aryl or $R^\yen$ benzyl group may be selected from alkyl groups, aryl groups, alkoxy groups, aryloxy groups, alkylaryl groups (e.g., a benzyl group), arylalkyl groups and halide groups.

In an embodiment of the disclosure, the phosphinimine catalyst will have a singly substituted indenyl ligand, 1-$R^\yen$-Indenyl, where the substituent $R^\yen$ is a (partially/fully) halide substituted alkyl group, a (partially/fully) halide substituted benzyl group, or a (partially/fully) halide substituted aryl group.

In an embodiment of the disclosure, the phosphinimine catalyst will have a singly substituted indenyl ligand, 1-$R^\yen$-Indenyl, where the substituent $R^\yen$ is a (partially/fully) halide substituted benzyl group.

When present on an indenyl ligand, a benzyl group can be partially or fully substituted by halide atoms, for example, fluoride atoms. The aryl group of the benzyl group may be a perfluorinated aryl group, a 2,6 (i.e., ortho) fluoro substituted phenyl group, 2,4,6 (i.e., ortho/para) fluoro substituted phenyl group or a 2,3,5,6 (i.e., ortho/meta) fluoro substituted phenyl group respectively. The benzyl group is, in an embodiment of the disclosure, located at the 1 position of the indenyl ligand.

In an embodiment of the disclosure, the phosphinimine catalyst will have a singly substituted indenyl ligand, 1-$R^\yen$-Indenyl, where the substituent $R^\yen$ is a pentafluorobenzyl ($C_6F_5CH_2$—) group.

In an embodiment of the disclosure, the phosphinimine catalyst has the formula: $(1\text{-}R^\yen\text{-}(Ind))M(N\!\!=\!\!P(t\text{-}Bu)_3)X_2$ where $R^\yen$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; M is Ti, Zr or Hf; and X is an activatable ligand.

In an embodiment of the disclosure, the phosphinimine catalyst has the formula: $(1\text{-}R^{\Psi}\text{-}(Ind))M(N=P(t\text{-}Bu)_3)X_2$ where $R^{\Psi}$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the disclosure, the phosphinimine catalyst has the formula: $(1\text{-}R^{\Psi}\text{-}(Ind))M(N=P(t\text{-}Bu)_3)X_2$ where $R^{\Psi}$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the disclosure, the phosphinimine catalyst has the formula: $(1\text{-}R^{\Psi}\text{-}(Ind))Ti(N=P(t\text{-}Bu)_3)X_2$ where $R^{\Psi}$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the disclosure, the phosphinimine catalyst has the formula: $(1\text{-}C_6F_5CH_2\text{-}Ind)M(N=P(t\text{-}Bu)_3)X_2$, where M is Ti, Zr or Hf; and X is an activatable ligand.

In an embodiment of the disclosure, the phosphinimine catalyst has the formula: $(1\text{-}C_6F_5CH_2\text{-}Ind)Ti(N=P(t\text{-}Bu)_3)X_2$, where X is an activatable ligand.

In an embodiment of the disclosure, the phosphinimine catalyst has the formula: $(1\text{-}C_6F_5CH_2\text{-}Ind)Ti(N=P(t\text{-}Bu)_3)Cl_2$.

The Cocatalyst

In the present disclosure, the single site catalyst is used in combination with at least one activator (or "cocatalyst") to form an active polymerization catalyst system for olefin polymerization. Activators (i.e., cocatalysts) include ionic activator cocatalysts and hydrocarbyl aluminoxane cocatalysts.

The activator used to activate the single site catalyst can be any suitable activator including one or more activators selected from alkylaluminoxanes and ionic activators, optionally together with an alkylating agent.

Without wishing to be bound by theory, the alkylaluminoxanes are complex aluminum compounds of the formula: $R^3_2Al^1O(R^3Al^1O)_mAl^1R^3_2$, wherein each $R^3$ is independently selected from $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the disclosure, $R^3$ of the alkylaluminoxane, is a methyl radical and m is from 10 to 40.

In some embodiments, the alkylaluminoxanes are typically used in substantial molar excess compared to the amount of group 4 transition metal in the single site catalyst. The $Al^1$:group 4 transition metal molar ratios are from 10:1 to 10,000:1, for example, about 30:1 to about 500:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present disclosure may be a combination of an alkylating agent (which may also serve as a scavenger) with an activator capable of ionizing the group 4 metal of the single site catalyst (i.e., an ionic activator). In this context, the activator can be chosen from one or more alkylaluminoxane and/or an ionic activator.

When present, the alkylating agent may be selected from $(R^4)_pMgX^2_{2-p}$ wherein $X^2$ is a halide and each $R^4$ is independently selected from $C_{1-10}$ alkyl radicals and p is 1 or 2; $R^4Li$ wherein in $R^4$ is as defined above, $(R^4)_qZnX^2_{2-q}$ wherein $R^4$ is as defined above, $X^2$ is halogen and q is 1 or 2; $(R^4)_sAl^2X^2_{3-s}$ wherein $R^4$ is as defined above, $X^2$ is halogen and s is an integer from 1 to 3. In some embodiments in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium $((Bu)_2Mg)$, and butyl ethyl magnesium (BuEtMg or BuMgEt).

The ionic activator may be selected from: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from phenyl radicals which are unsubstituted or substituted with from 3 to 5 substituents selected from a fluorine atom, a $C_{1-4}$ alkyl or alkoxy radical which is unsubstituted or substituted by a fluorine atom; and a silyl radical of the formula $-Si-(R^7)_3$; wherein each $R^7$ is independently selected from a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In some embodiments in the above compounds, $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g., $PhR^8_2NH^+$, which is substituted by two $R^8$ radicals such as for example two $C_{1-4}$ alkyl radicals).

Examples of compounds capable of ionizing the single site catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl) boron, tributylammonium tetra(p-trifluoromethylphenyl) boron, tributylammonium tetra(pentafluorophenyl)boron, tri (n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl) boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltrispentafluorophenyl borate, triphenylmethylium phenyltrispentafluorophenyl borate, benzene (diazonium) phenyltrispentafluorophenyl borate, tropillium tetrakis (2,3, 5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4, 5-trifluorophenyl) borate, benzene (diazonium) tetrakis (3,4, 5-trifluorophenyl) borate, tropillium tetrakis (1,2,2-trifluoroethenyl) borate, trophenylmethylium tetrakis (1,2, 2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Commercially available activators which are capable of ionizing the group 4 metal of the single site catalyst include: N,N-dimethylaniliniumtetrakispentafluorophenyl borate ("[Me$_2$NHPh][B(C$_6$F$_5$)$_4$]"); triphenylmethylium tetrakispentafluorophenyl borate ("[Ph$_3$C][B(C$_6$F$_5$)$_4$]"); and tris-pentafluorophenyl boron and MAO (methylaluminoxane) and MMAO (modified methylaluminoxane).

The ionic activators compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

The Inert Support

In the present disclosure, the single site catalyst is supported on an inert support. The support used in the present disclosure can be any support known in the art to be suitable for use with polymerization catalysts. For example, the support can be any porous or non-porous support material, such as talc, inorganic oxides, inorganic chlorides, aluminophosphates (i.e., AlPO$_4$) and polymer supports (e.g., polystyrene, etc). Examples of supports include Group 2, 3, 4, 5, 13 and 14 metal oxides, for example, silica, alumina, silica-alumina, magnesium oxide, magnesium chloride, zirconia, titania, clay (e.g., montmorillonite) and mixtures thereof.

Agglomerate supports such as agglomerates of silica and clay may also be used as a support in the current disclosure.

In some embodiments, the supports are used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In embodiments of the disclosure, the support is calcined at temperatures above 200° C., or above 300° C., or above, 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in *J. Phys. Chem.,* 72 (8), 1968, page 2926.

In some embodiments, the support material, especially an inorganic oxide, such as silica, typically has a surface area of from about 10 to about 700 m$^2$/g, a pore volume in the range from about 0.1 to about 4.0 cc/g and an average particle size of from about 5 to about 500 μm. In a specific embodiment, the support material has a surface area of from about 50 to about 500 m$^2$/g, a pore volume in the range from about 0.5 to about 3.5 cc/g and an average particle size of from about 10 to about 200 μm. In another specific embodiment, the support material has a surface area of from about 100 to about 400 m$^2$/g, a pore volume in the range from about 0.8 to about 3.0 cc/g and an average particle size of from about 5 to about 100 μm.

In some embodiments, the support material, especially an inorganic oxide, such as silica, typically has an average pore size (i.e., pore diameter) of from about 10 to about 1000 Angstroms (Å). In a specific embodiment, the support material has an average pore size of from about 50 to about 500 Å. In another specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society,* 1938, v 60, pp. 309-319.

A silica support which is suitable for use in the present disclosure has a high surface area and is amorphous. By way of example, useful silicas are commercially available under the trademark of Sylopol® 958, 955 and 2408 from Davison Catalysts, a Division of W. R. Grace and Company and ES-70W by PQ Corporation.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,958,375.

An agglomerate of clay and inorganic oxide which may be useful in the current disclosure may have the following properties: a surface area of from about 20 to about 800 m$^2$/g, for example, from 50 to about 600 m$^2$/g; particles with a bulk density of from about 0.15 to about 1 g/ml, for example, from about 0.20 to about 0.75 g/ml; an average pore diameter of from about 30 to about 300 Angstroms (Å), for example, from about 60 to about 150 Å; a total pore volume of from about 0.10 to about 2.0 cc/g, for example, from about 0.5 to about 1.8 cc/g; and an average particle size of from about 4 to 150 microns (μm), for example, from about 8 to 100 microns.

Optionally, a support, for example a silica support, may be treated with one or more salts of the type: Zr(SO$_4$)$_2$.4H$_2$O, ZrO(NO$_3$)$_2$, and Fe(NO$_3$)$_3$ as taught in CA Patent Application No. 2,716,772 to the same applicant. Supports that have been otherwise chemically treated are also contemplated for use with the catalysts and processes of the present disclosure.

Without wishing to be bound by theory, Zr(SO$_4$)$_2$.4H$_2$O and ZrO(NO$_3$)$_2$ may each act as a source of zirconium oxide (i.e., ZrO$_2$) which may form for example after calcinations temperatures are employed. Alternately, the Zr(SO$_4$)$_2$.4H$_2$O can be used to add Zr(SO$_4$)$_2$ to an inert support if suitably high calcinations temperatures (those which promote formation of zirconium oxide) are not employed.

The present disclosure is not limited to any particular procedure for supporting the single site catalyst or the cocatalyst. Processes for depositing a single site catalyst complex and/or a cocatalyst on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods to support a phosphinimine catalyst see U.S. Pat. No. 5,965,677). For example, the single site catalyst may be added to a support by co-precipitation with the support material. The cocatalyst can be added to a support before and/or after the single site catalyst or together with the single site catalyst (e.g., a phosphinimine catalyst may be mixed with a cocatalyst in a suitable solvent or diluents and the mixture added to a support). Optionally, the cocatalyst can be added to a supported single site catalyst in situ or on route to a reactor. The single site catalyst and/or cocatalyst may be slurried or dissolved in a suitable diluent or solvent respectively and then added to a support. Suitable solvents or diluents include but are not limited to hydrocarbons and mineral oil. The single site catalyst may be added to the solid support, in the form of a solid, solution or slurry, followed by the addition of the cocatalyst in solid form or as a solution or slurry. The cocatalyst may be added to the solid support, in the form of a solid, solution or slurry, followed by the addition of the single site catalyst in solid form or as a solution or slurry. Single site catalyst, cocatalyst, and support can be mixed together in the presence or absence of a diluent or solvent, but in some embodiments, use of diluent(s) or solvent(s) is preferred.

The Polymerization Process

Olefin polymerization processes which are compatible with the current disclosure include gas phase, slurry phase and combined gas phase/slurry phase polymerization processes, with gas phase processes being preferred in some embodiments. For example, ethylene copolymerization with an alpha-olefin is carried out in the gas phase, in for example at least one fluidized bed reactor.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e., normal butane and/or isobutane), pentanes, hexanes, heptanes and octanes. The monomers may be soluble in (or miscible with) the diluent, but the polymer is not (under polymerization conditions). The polymerization temperature may be, for example, from about 5° C. to about 200° C., or, for example, less than about 120° C., or, for example, from about 10° C. to 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e., from 30 to 90 atmospheres—about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. In some embodiments the reaction typically takes place in a jacketed closed loop reactor having an internal stirrer (e.g., an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

In some embodiments, a gas phase process is carried out in a fluidized bed reactor. Such gas phase processes are widely described in the literature. As an example, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as, condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene and polyethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g., 5-methylene-2-norbornene and 5-ethylidene-2-norbornene, bicyclo-(2,2,1)-hepta-2,5-diene).

In an embodiment, the disclosure is directed toward a polymerization process involving the polymerization of one or more of the monomer(s) and comonomer(s) including ethylene alone or in combination with one or more linear or branched comonomer(s) having from 3 to 30 carbon atoms, for example, 3-12 carbon atoms, or for example, 4 to 8 carbon atoms. The process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. In some embodiments, the comonomer is an alpha-olefin having from 3 to 15 carbon atoms, for example, 4 to 12 carbon atoms, or for example, 4 to 10 carbon atoms.

In an embodiment of the present disclosure, ethylene is copolymerized with an alpha olefin having from 3-10 carbon atoms and ethylene makes up at least 75 wt % of the total olefin feed entering the reactor.

In an embodiment of the present disclosure, ethylene is copolymerized with an alpha olefin having from 3-10 carbon atoms and ethylene makes up at least 85 wt % of the total olefin feed entering the reactor.

In embodiments of the present disclosure, ethylene is copolymerized with propylene, 1-butene, 1-hexene or 1-octene.

In an embodiment of the present disclosure, ethylene is copolymerized with 1-butene and ethylene makes up at least 75 weight % (i.e., wt %) of the total olefin feed entering the reactor.

In an embodiment of the present disclosure, ethylene is copolymerized with 1-hexene and ethylene makes up at least 75 wt % of the total olefin feed entering the reactor.

In an embodiment of the present disclosure, ethylene is copolymerized with 1-hexene and ethylene makes up at least 85 wt % of the total olefin feed entering the reactor.

Gas phase fluidized bed polymerization processes may employ a polymer seed bed in the reactor prior to initiating the polymerization process. It is contemplated by the current disclosure to use a polymer seed bed that has been treated with an antistatic agent or an optional scavenger. In addition, the polymer products obtained by using the catalysts and processes of the current disclosure may themselves be used as polymer seed bed materials.

Optionally, scavengers are added to the polymerization process. The present disclosure can be carried out in the presence of any suitable scavenger or scavengers. Scavengers are well known in the art.

In an embodiment of the disclosure, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or hydrocarbyl aluminoxanes having the formula: $R^3_2Al^1O(R^3Al^1O)_mAl^1R^3_2$ wherein each $R^3$ is independently selected from $C_{1-20}$ hydrocarbyl radicals and m is from 3 to 50. Some non-limiting examples of scavengers useful in the current disclosure include triisobutylaluminum, triethylaluminum, trimethylaluminum or other trihydrocarbyl aluminum compounds.

The scavenger may be used in any suitable amount but by way of non-limiting examples only, can be present in an amount to provide a molar ratio of Al:M (where M is the metal of the phosphinimine catalyst) of from about 20 to about 2000, or from about 50 to about 1000, or from about 100 to about 500. In some embodiments, the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not specifically defined and is carried out by procedures well known in the art.

The scavenger can be fed to the reactor using any suitable means and may be diluted or dissolved in a suitable liquid hydrocarbon diluent or solvent respectively.

The polymerization process may be carried out in the presence of any suitable anti-static agent or agents. The use of anti-static agents in a gas-phase or a slurry phase polymerization processes is well known in the art. Antistatic agents are also recognized in the art by the term "continuity additive" or "catalyst modifier". As used herein a "continuity additive" is a substance or a mixture of substances which, when present in appropriate amounts, can reduce, prevent or mitigate at least one of fouling, sheeting, and static level of a material in polymerization reactor.

Some non-limiting examples of continuity additives are alkoxylated amines (also known as alkanolamines, see European Patent No. 811,638 and U.S. Pat. Nos. 6,140,432; 6,124,230; 6,114,479 for examples), carboxylate metal salts (see U.S. Pat. Nos. 7,354,880; 6,300,436; 6,306,984; 6,391,819; 6,472,342 and 6,608,153 for examples), polysulfones, polymeric polyamines and sulfonic acids (see U.S. Pat. Nos. 6,562,924; 6,022,935 and 5,283,278 for examples). Other possible continuity additives are described in European Patent Application No. 107,127, including polyoxyethylene-alkylamines.

Specific examples of alkoxylated amines which may be used in the present disclosure are Kemamine AS-990™, ARMOSTAT 1800™, and ATMER-163™ which are available from Ciba, Akzo-Nobel or Witco Chemical Company. Other suitable continuity additives include aluminum stearate and aluminum oleate. Still other specific continuity additives are supplied commercially under the trademarks OCTASTAT™ and STADIS™. The continuity additive STADIS is described in U.S. Pat. Nos. 7,476,715; 6,562,924 and 5,026,795 and is available from Octel Starreon. STADIS generally comprises a polysulfone copolymer, a polymeric amine and an oil soluble sulfonic acid. Another suitable continuity additive which is similar to STADIS is commercially available under the tradename STATSAFE™.

In an embodiment of the disclosure, a continuity additive is added directly to the supported catalyst. The amount of continuity additive added to a catalyst will depend on a number of factors such as but not limited to the type of continuity additive and the type of polymerization catalyst (and the type of support). Accordingly the amount of continuity additive used is not specifically defined, but can be from 0 (e.g., optionally) up to 150,000 parts per million (ppm) based on the weight of the supported catalyst. Alternatively, the amount of continuity additive added to a catalyst can be from about 0.2 to 10 weight percent based on the total weight of the catalyst system. By way of non-limiting example only, from 10,000 to 30,000 ppm of a STADIS continuity additive is used when it is combined with a supported polymerization catalyst.

In another embodiment, the antistatic agent may be added directly to the reactor and separately from the polymerization catalyst. The total amount of continuity additive or additives to be present in the reactor will, in some embodiments, not exceed 250 or 200, or 150, or 125, or 100, or 90, or 80, or 70 or 60, or 50, or 40, or 30, or 20 or 10 ppm (parts per million by weight of polymer being produced) and/or the amount of continuity additive will be zero, or greater than 1, or 3, or 5, or 7, or 10, or 12, or 14, or 15, or 17, or 20 ppm based on the weight of polymer being produced (usually expressed as pounds or kilograms per unit of time). Any of these lower limits are combinable with any upper limit. These amounts of continuity additive contemplate one, two, three, four or more continuity additives. The total amount of one or two or more continuity additives in the reactor will be understood to be additive and where the total amount can be described as disclosed immediately above. The continuity additive can be added directly to the reactor through a dedicated feed line, and/or added to any convenient feed stream, including the ethylene feed stream, the comonomer feed stream, the catalyst feed line, or the recycle line. If more than one continuity additive is used, each one may be added to the reactor as separate feed streams, or as any combination of separate feed streams or mixtures. The manner in which the continuity additives are added to the reactor is not important, so long as the additive(s) are well dispersed within the fluidized bed, and that their feed rates (or concentrations) are regulated in a manner to provide minimum levels of fouling and/or static. From the productivity of the catalyst it is fairly routine to determine the feed rate of the antistatic agent to the reactor based on the catalyst feed rate.

In another embodiment of the disclosure, the continuity additive (e.g., antistatic agent) may be added directly to the reactor and separately from the polymerization catalyst as well as added directly to the supported catalyst.

Method to Control Comonomer Placement

In the present disclosure a method is provided which allows one to control the placement of comonomer within an ethylene copolymer. A comonomer is herein defined as a polymerizable olefin other than ethylene and hence a comonomer is an "alpha-olefin", which by way of non-limiting example only, may be 1-butene, 1-hexene, 1-octene and the like.

In an embodiment of the disclosure, the method involves deliberately changing the variability of a Cx/C2 (i.e., a comonomer alpha olefin to ethylene) molar ratio within a polymerization reactor, wherein the variability is defined as the percent standard deviation in the Cx/C2 molar ratio from the average Cx/C2 molar ratio present in the polymerization reactor as measured over a specifically defined polymerization reaction time period.

In an embodiment of the disclosure, the polymerization reactor is a gas phase polymerization reactor.

In an embodiment of the disclosure, ethylene is polymerized with one or more comonomer Cx in a gas phase reactor.

In an embodiment of the disclosure, ethylene is polymerized with a commoner Cx in a gas phase reactor.

In an embodiment of the disclosure, ethylene is polymerized with a single type of commoner Cx in a gas phase reactor.

In the present disclosure, the data used for the calculation of variability is obtained during the polymerization reaction period per se (i.e. when Cx and C2 are being consumed by the catalyst).

The definition of standard deviation is well known in the art and for Cx/C2 can be defined as $\sqrt{[\Sigma(X-X^{ave})^2/(n-1)]}$ where X is the molar ratio of Cx/C2, $X^{ave}$ is the average molar ratio of Cx/C2, and n is the sample size.

The standard deviation can also be expressed as percentage of the average which is known in the art as the coefficient of variation. Herein, we use the simple term "variability" to express the coefficient of variation for Cx/C2 molar ratios. Hence, to express the "variability" for the molar ratio of Cx/C2, one takes the standard deviation in the molar ratio of Cx/C2, divides by the average molar ratio of Cx/C2 and then multiplies by 100.

It will be obvious to a person skilled in the art that the average Cx/C2 molar ratio in the gas phase or the variability for the Cx/C2 molar ratio, or the Cx/C2 molar ratio at any time during the polymerization reaction can be altered by changing for example the comonomer feed rate to the reactor, the ethylene feed rate to the reactor, or both.

In another embodiment of the disclosure, the method involves deliberately changing the variability of a H2/C2 (i.e., hydrogen to ethylene) molar ratio within a polymerization reactor, wherein the variability is defined as the percent standard deviation in the H2/C2 molar ratio from the average H2/C2 molar ratio present in the polymerization reactor as measured over a specifically defined polymerization reaction time period.

In the present disclosure, the data used for the calculation of variability is obtained during the polymerization reaction period per se (i.e., when H2 and C2 are being consumed by the catalyst).

The definition of standard deviation is well known in the art and for H2/C2 can be defined as $\sqrt{[\Sigma(X-X^{ave})^2/(n-1)]}$ where X is the molar ratio of H2/C2, $X^{ave}$ is the average molar ratio of H2/C2, and n is the sample size.

The standard deviation can also be expressed as percentage of the average which is known in the art as the coefficient of variation. Herein, we use the simple term "variability" to express the coefficient of variation for H2/C2 molar ratios. Hence to express the "variability" for the molar ratio of H2/C2, one takes the standard deviation in the molar ratio of H2/C2 and divides by the average molar ratio of H2/C2 and then multiplies by 100.

In yet another embodiment of the disclosure, the method involves deliberately changing the variability of a both a Cx/C2 and a H2/C2 molar ratio within a polymerization reactor, wherein the variability is defined as the percent standard deviation in the Cx/C2 and in the H2/C2 molar ratio from the average Cx/C2 and H2/C2 molar ratios respectively present in the polymerization reactor as measured over a specifically defined polymerization reaction time period.

It will be obvious to a person skilled in the art that the average H2/C2 molar ratio in the gas phase or the variability for the H2/C2 molar ratio, or the H2/C2 molar ratio at any time during the polymerization reaction can be altered by changing for example the hydrogen feed rate to the reactor, the ethylene feed rate to the reactor, or both.

An embodiment of the disclosure is a method of controlling the placement of comonomer in an ethylene copolymer, the method comprising polymerizing ethylene (C2) and one or more comonomers (Cx) at an average Cx/C2 molar ratio with a single site catalyst system in a gas phase reactor and deliberately changing the variability of the Cx/C2 molar ratio within the gas phase reactor wherein the variability is measured as the percent standard deviation in the Cx/C2 molar ratio from the average Cx/C2 molar ratio.

An embodiment of the disclosure is a method of controlling the placement of comonomer in an ethylene copolymer, the method comprising polymerizing ethylene (C2) and one or more comonomers (Cx) at an average Cx/C2 molar ratio and at an average H2/C2 molar ratio with a single site catalyst system in a gas phase reactor and i) deliberately changing the variability of the Cx/C2 molar ratio within the gas phase reactor wherein the variability is measured as the percent standard deviation in the Cx/C2 molar ratio from the average Cx/C2 molar ratio, and optionally ii) deliberately changing the variability of the H2/C2 molar ratio within the gas phase reactor wherein the variability is measured as the percent standard deviation in the H2/C2 molar ratio from the average H2/C2 molar ratio.

In an embodiment of the disclosure, the variability of the Cx/C2 molar ratio within a gas phase reactor is changed. In an embodiment of the disclosure, the variability of the Cx/C2 molar ratio within a gas phase reactor is increased. In an embodiment of the disclosure, variability of the Cx/C2 molar ratio within a gas phase reactor is decreased.

In an embodiment of the disclosure, the variability of the H2/C2 molar ratio within a gas phase reactor is changed. In an embodiment of the disclosure, the variability of the H2/C2 molar ratio within a gas phase reactor is increased. In an embodiment of the disclosure, variability of the H2/C2 molar ratio within a gas phase reactor is decreased.

In embodiments of the disclosure, the variability of the Cx/C2 molar ratio within a gas phase reactor is increased by at least 1%, or at least 3%, or at least 5%, or at least 7.5%, or at least 10%, or at least 12.5%, or at least 15%, or at least 17.5%, or at least 20%, or at least 25%.

In embodiments of the disclosure, the variability of the Cx/C2 molar ratio within a gas phase reactor is decreased by at least 1%, or at least 3%, or at least 5%, or at least 7.5%, or at least 10%, or at least 12.5%, or at least 15%, or at least 17.5%, or at least 20%, or at least 25%.

In embodiments of the disclosure, the variability of the Cx/C2 molar ratio within a gas phase reactor is changed by at least 1%, or at least 3%, or at least 5%, or at least 7.5%, or at least 10%, or at least 12.5%, or at least 15%, or at least 17.5%, or at least 20%, or at least 25%.

In an embodiment of the disclosure, an increase in the variability of the Cx/C2 molar ratio within a gas phase reactor causes the slope of comonomer incorporation defined as the number of short chain branches at Mz divided by the number of short chain branches at Mn in the ethylene copolymer being produced, to decrease.

In an embodiment of the disclosure, a decrease in the variability of the Cx/C2 molar ratio within a gas phase reactor causes the slope of comonomer incorporation defined as the number of short chain branches at Mz divided by the number of short chain branches at Mn in the ethylene copolymer being produced, to increase.

In an embodiment of the disclosure, an increase in the variability of the Cx/C2 molar ratio within a gas phase reactor causes the comonomer incorporation profile in the ethylene copolymer being produced, to change from a reversed comonomer incorporation profile to an approximately flat comonomer incorporation profile.

In an embodiment of the disclosure, an increase in the variability of the Cx/C2 molar ratio within a gas phase reactor causes the comonomer incorporation profile in the ethylene copolymer being produced, to change from a reversed comonomer incorporation profile to a normal comonomer incorporation profile.

In an embodiment of the disclosure, an increase in the variability of the Cx/C2 molar ratio within a gas phase reactor causes the comonomer incorporation profile in the ethylene copolymer being produced, to change from an approximately flat incorporation profile to a normal comonomer incorporation profile.

In an embodiment of the disclosure, an increase in the variability of the Cx/C2 molar ratio within a gas phase reactor produces an ethylene copolymer having an approximately flat comonomer incorporation profile.

In an embodiment of the disclosure, an increase in the variability of the Cx/C2 molar ratio within a gas phase reactor produces an ethylene copolymer having a normal comonomer incorporation profile.

In an embodiment of the disclosure, a decrease in the variability of the Cx/C2 molar ratio within a gas phase reactor causes the comonomer incorporation profile in the ethylene copolymer being produced, to change from an approximately flat incorporation profile to a reversed comonomer incorporation profile.

In an embodiment of the disclosure, a decrease in the variability of the Cx/C2 molar ratio within a gas phase reactor causes the comonomer incorporation profile in the ethylene copolymer being produced, to change from a normal incorporation profile to a reversed comonomer incorporation profile.

In an embodiment of the disclosure, a decrease in the variability of the Cx/C2 molar ratio within a gas phase reactor causes the comonomer incorporation profile in the ethylene copolymer being produced, to change from a normal incorporation profile to an approximately flat comonomer incorporation profile.

In an embodiment of the disclosure, a decrease in the variability of the Cx/C2 molar ratio within a gas phase reactor produces an ethylene copolymer having a reversed comonomer incorporation profile.

In an embodiment of the disclosure, a decrease in the variability of the Cx/C2 molar ratio within a gas phase reactor produces an ethylene copolymer having an approximately flat comonomer incorporation profile.

In an embodiment of the disclosure, a change in the variability of the Cx/C2 molar ratio within a gas phase reactor will change the density of the ethylene copolymer produced by less than 0.0075 $g/cm^3$, or less than 0.005 $g/cm^3$, or less than 0.003 $g/cm^3$, or less than 0.001 $g/cm^3$, or less than 0.0005 $g/cm^3$.

In an embodiment of the disclosure, an increase in the variability of the Cx/C2 molar ratio within a gas phase reactor will change the density of the ethylene copolymer produced by less than 0.0075 $g/cm^3$, or less than 0.005 $g/cm^3$, or less than 0.003 $g/cm^3$, or less than 0.001 $g/cm^3$, or less than 0.0005 $g/cm^3$.

In an embodiment of the disclosure, a decrease in the variability of the Cx/C2 molar ratio within a gas phase reactor will change the density of the ethylene copolymer produced by less than 0.0075 $g/cm^3$, or less than 0.005 $g/cm^3$, or less than 0.003 $g/cm^3$, or less than 0.001 $g/cm^3$, or less than 0.0005 $g/cm^3$.

In an embodiment of the disclosure, the variability of the Cx/C2 molar ratio is changed in a stepwise fashion.

In an embodiment of the disclosure, the variability of the Cx/C2 molar ratio is changed in a continuous fashion.

In an embodiment of the disclosure, the variability of the Cx/C2 molar ratio is changed in a cyclical fashion.

In an embodiment of the disclosure, the Cx/C2 molar ratio is cycled around a target average Cx/C2 molar ratio.

In an embodiment of the disclosure, the Cx/C2 molar ratio when plotted against the target average Cx/C2 molar ratio as a function of time takes the shape of curve selected from the group of sine waves, square waves, symmetrical or asymmetrical waves, triangular waves, and the like, with constant or varying periods, or a combination of any of these curves.

In an embodiment of the disclosure, a method for altering the placement of comonomer in an ethylene copolymer comprises polymerizing ethylene (C2) and one or more comonomers (Cx) with a single site catalyst system under gas phase polymerization conditions and i) changing polymerization conditions from a first set of conditions in which the molar ratio of Cx/C2 is maintained within a 3%, or a 5%, or a 7.5%, or 10%, or a 12.5%, or a 15%, or a 17.5%, or a 20%, or a 25%, or a 30%, or a 35% standard deviation from a target average Cx/C2 ratio to a second set of conditions in which the molar ratio of Cx/C2 varies beyond a 3%, or a 5%, or a 7.5%, or 10%, or a 12.5%, or a 15%, or a 17.5%, or a 20%, or a 25%, or a 30%, or a 35% standard deviation from the target average Cx/C2 ratio respectively, and optionally, changing polymerization conditions from a first set of conditions in which the molar ratio of H2/C2 is maintained within a 3%, or a 5%, or a 7.5%, or 10%, or a 12.5%, or a 15%, or a 17.5%, or a 20%, or a 25%, or a 30%, or a 35% standard deviation from a target average H2/C2 ratio to a second set of conditions in which the molar ratio of H2/C2 varies beyond a 3%, or a 5%, or a 7.5%, or 10%, or a 12.5%, or a 15%, or a 17.5%, or a 20%, or a 25%, or a 30%, or a 35% standard deviation from the target average H2/C2 ratio respectively; or ii) changing polymerization conditions from a first set of conditions in which the molar ratio of Cx/C2 varies beyond a 3%, or a 5%, or a 7.5%, or 10%, or a 12.5%, or a 15%, or a 17.5%, or a 20%, or a 25%, or a 30%, or a 35% standard deviation from a target average Cx/C2 ratio to a second set of conditions in which the molar ratio of Cx/C2 is maintained within a 3%, or 5%, or a 7.5%, or 10%, or a 12.5%, or a 15%, or a 17.5%, or a 20%, or a 25%, or a 30%, or a 35% standard deviation from the target average Cx/C2 ratio respectively, and optionally changing polymerization conditions from a first set of conditions in which the molar ratio of H2/C2 varies beyond a 3%, or a 5%, or a 7.5%, or 10%, or a 12.5%, or a 15%, or a 17.5%, or a 20%, or a 25%, or a 30%, or a 35% standard deviation from a target average H2/C2 ratio to a second set of conditions in which the molar ratio of H2/C2 is maintained within a 3%, or a 5%, or a 7.5%, or 10%, or a 12.5%, or a 15%, or a 17.5%, or a 20%, or a 25%, or a 30%, or a 35% standard deviation from the target average H2/C2 ratio respectively.

In an embodiment of the disclosure, a method for altering the placement of comonomer in an ethylene copolymer comprises polymerizing ethylene (C2) and one or more comonomers (Cx) with a single site catalyst system under gas phase polymerization conditions and i) changing polymerization conditions from a first set of conditions in which the molar ratio of Cx/C2 is maintained within a 3%, or a 5%, or a 7.5%, or 10%, or a 12.5%, or a 15%, or a 17.5%, or a 20%, or a 25%, or a 30%, or a 35% standard deviation from a target average Cx/C2 ratio to a second set of conditions in which the molar ratio of Cx/C2 varies beyond a 3%, or a 5%, or a 7.5%, or 10%, or a 12.5%, or a 15%, or a 17.5%, or a 20%, or a 25%, or a 30%, or a 35% standard deviation of the target average Cx/C2 ratio respectively; or ii) changing polymerization conditions from a first set of conditions in which the molar ratio of Cx/C2 varies beyond a 3%, or a 5%, or a 7.5%, or 10%, or a 12.5%, or a 15%, or a 17.5%, or a 20%, or a 25%, or a 30%, or a 35% standard deviation from a target average Cx/C2 ratio to a second set of conditions in which the molar ratio of Cx/C2 is maintained within a 3%, or 5%, or a 7.5%, or 10%, or a 12.5%, or a 15%, or a 17.5%, or a 20%, or a 25%, or a 30%, or a 35% standard deviation from the target average Cx/C2 ratio respectively.

In an embodiment of the disclosure, the ethylene copolymer produced will have a flat comonomer incorporation profile as measured using Gel-Permeation Chromatography with Fourier Transform Infra-Red detection (GPC-FTIR).

In an embodiment of the disclosure, the ethylene copolymer produced will have a negative (i.e., "normal") comonomer incorporation profile as measured using GPC-FTIR.

In an embodiment of the disclosure, the ethylene copolymer produced will have an inverse (i.e., "reverse") or partially inverse comonomer incorporation profile as measured using GPC-FTIR.

If the comonomer incorporation decreases with molecular weight as measured using GPC-FTIR, the comonomer incorporation or distribution is described as "normal" or "negative". If the comonomer incorporation is approximately constant with molecular weight as measured using GPC-FTIR, the comonomer incorporation or distribution is described as "flat" or "uniform". The terms "reverse comonomer incorporation/distribution" and "partially reverse comonomer incorporation/distribution" mean that in the GPC-FTIR data obtained for the copolymer, there is one, or more, higher molecular weight components having a higher comonomer incorporation than in one or more lower molecular weight segments. The term "reverse(d) comonomer incorporation/distribution" is used herein to mean, that across the molecular weight range of the ethylene copolymer, comonomer contents for the various polymer fractions are not substantially uniform and the higher molecular weight fractions thereof have proportionally higher comonomer contents (i.e., if the comonomer incorporation rises with molecular weight, the incorporation/distribution is described as "reverse" or "reversed"). Where the comonomer incorporation rises with increasing molecular weight and then declines, the comonomer incorporation/distribution is still considered "reverse", but may also be described as "partially reverse".

An embodiment of the disclosure is a method of controlling the placement of comonomer in an ethylene copolymer, the method comprising polymerizing ethylene (C2) and one or more comonomer (Cx) at an average Cx/C2 molar ratio with a single site catalyst system in a gas phase reactor and deliberately changing the variability of the Cx/C2 molar ratio within the gas phase reactor wherein the variability is measured as the percent standard deviation in the Cx/C2 molar ratio from the average Cx/C2 molar ratio.

In an embodiment of the disclosure, the variability of the Cx/C2 molar ratio within the gas phase reactor is increased.

In an embodiment of the disclosure, the variability of the Cx/C2 molar ratio within the gas phase reactor is decreased.

In an embodiment of the disclosure, the variability of the Cx/C2 molar ratio within the gas phase reactor is increased by at least 5%.

In an embodiment of the disclosure, the variability of the Cx/C2 molar ratio within the gas phase reactor is increased by at least 10%.

In an embodiment of the disclosure, the variability of the Cx/C2 molar ratio within the gas phase reactor is decreased by at least 5%.

In an embodiment of the disclosure, the variability of the Cx/C2 molar ratio within the gas phase reactor is decreased by at least 10%.

In an embodiment of the disclosure, the density of the ethylene copolymer changes by less than 0.005 g/cm$^3$.

In an embodiment of the disclosure, the density of the ethylene copolymer changes by less than 0.003 g/cm$^3$.

In an embodiment of the disclosure, the comonomer Cx is selected from 1-butene, 1-hexene and 1-octene.

In an embodiment of the disclosure, the single site catalyst system comprises a phosphinimine catalyst, a catalyst activator and a support.

In an embodiment of the disclosure, the variability of the Cx/C2 molar ratio is changed in a stepwise fashion.

In an embodiment of the disclosure, the variability of the Cx/C2 molar ratio is changed in a continuous fashion.

In an embodiment of the disclosure, the variability of the Cx/C2 molar ratio is changed in a continuous stepwise fashion (e.g., a combined continuous and stepwise fashion).

In an embodiment of the disclosure, the Cx/C2 molar ratio is cycled around the targeted average Cx/C2 ratio.

In an embodiment of the disclosure, the method further comprises polymerizing ethylene (C2) and one or more comonomers (Cx) at an average H2/C2 molar ratio with a single site catalyst system in a gas phase reactor and deliberately changing the variability of the H2/C2 molar ratio within the gas phase reactor wherein the variability is measured as the percent standard deviation in the H2/C2 molar ratio from the average H2/C2 molar ratio.

The methods of the present disclosure can be described alternatively by any of the embodiments disclosed herein, or combinations of any of the embodiments described herein. Embodiments of the disclosure, while not meant to limited by, may be further described and understood by reference to the following non-limiting examples.

EXAMPLES

General

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v 15, p. 1518 or used directly after being stored over activated 4 Å molecular sieves. The methylaluminoxane used was a 10% MAO solution in toluene supplied by Albemarle which was used as received. The support used was silica Sylopol 2408 obtained from W.R. Grace. & Co. The support was calcined by fluidizing with air at 200° C. for 2 hours followed by nitrogen at 600° C. for 6 hours and stored under nitrogen.

Melt index, $I_2$, in g/10 min was determined on a Tinius Olsen Plastomer (Model MP993) in accordance with ASTM D1238 Procedure A (Manual Operation) at 190° C. with a 2.16 kilogram weight. High load melt index, I21, in g/10 min was determined in accordance with ASTM D1238 Procedure A at 190° C. with a 21.6 kilogram weight. Melt flow ratio (also sometimes called melt index ratio) is $I_{21}/I_2$.

Polymer density was determined in grams per cubic centimeter (g/cc) according to ASTM D792.

Molecular weight information ($M_w$, $M_n$ and $M_z$ in g/mol) and molecular weight distribution ($M_w/M_n$), and z-average molecular weight distribution ($M_Z/M_W$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e., the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Reactor content analysis (ethylene, 1-hexene, hydrogen and nitrogen) was performed by a Siemens Maxum edition II process gas chromatograph. A slip stream of sample is continuously vented to the GC from the reactor during the polymerization where it was analyzed. The GC was equipped with Thermal Conductivity Detectors and dual ovens to enable parallel chromatography, thereby reducing analysis' time.

950 g of commercially available Armostat® 1800 (mp 50° C., bp >300° C.), which was used as a catalyst modifier, was loaded in a 2 L-round bottom flask and melted in an oil bath at 80° C. The oil bath temperature was then raised to 150° C. and a high vacuum was applied while maintaining stirring. At first, a lot of bubbles were seen due to the release of gas and moisture vapor. Approximately two hours later, gas evolution subsided and heating/evacuation was continued for another hour. The Armostat 1800 material was then cooled down to room temperature and stored under nitrogen atmosphere until use.

Catalysts A

The phosphinimine catalyst compound (1,2-(n-propyl)($C_6F_5$)Cp)Ti(N=P(t-Bu)$_3$) $Cl_2$ was made in a manner similar to the procedure given in U.S. Pat. No. 7,531,602 (see Example 2).

Preparation of the Supported Catalyst A1: In a 3 L, three-neck round bottom flask equipped with an overhead stirrer was added toluene (330 mL). While the stirrer was maintained at 200 rpm, dehydrated silica (81.86 g) was added. A 10 wt % of MAO in toluene solution (155.0 g) was added into the flask by cannula over a period of 16 minutes while stirring was maintained. The MAO solution container was rinsed with toluene (3×25 mL), and the rinses were added into the flask. The slurry was stirred for 2 hours at room temperature. The titanium complex (1,2-(n-propyl)($C_6F_5$)Cp)Ti(N=P(t-Bu)$_3$)$Cl_2$ (1.512 g) was then added into the flask in solid form over a period of 4 minutes. The slurry was stirred for 2 hours at ambient temperature. A 15 wt % Armostat-1800 in toluene solution (18.103 g) was added into the flask over a period of 3 minutes. The container was rinsed with toluene (3×5 mL), and the rinses were added in the flask. The slurry was further stirred at ambient temperature for 30 minutes. The catalyst slurry was poured into a fritted funnel, which was fitted onto a filter flask, and reduced pressure applied to the filter flask to separate the reaction solvent. Toluene (150 mL) was added to the filter cake and stirred with a spatula to obtain a well dispersed slurry. Reduced pressure was then applied to the filter flask to remove the wash solvent. Pentane (150 mL) was added to the filter cake and stirred with spatula to obtain a well dispersed slurry. Reduced pressure was then applied to the filter flask to remove wash solvent. A second pentane wash was done and reduced pressure applied to remove solvent until the filter cake appears to be dry. The filter cake was then transferred to a 2 L round-bottomed flask and the catalyst was dried by applying reduced pressure to the flask until 300 mTorr was obtained. The catalyst had 2.7 weight percent of Armostat-1800 present.

Preparation of the Supported Catalyst A2. In a 3 L, three-neck round bottom flask equipped with an overhead stirrer was added toluene (330 mL). While the stirrer was maintained at 200 rpm, dehydrated silica (76.002 g) was added. A 10 wt % of MAO in toluene solution (209.119 g) was added into the flask by cannula over a period of 16 minutes while stirring was maintained. The MAO solution container was rinsed with toluene (3×25 mL), and the rinses were added into the flask. The slurry was stirred for 2 hours at room temperature. The titanium complex (1,2-(n-propyl) ($C_6F_5$)Cp)Ti(N=P(t-Bu)$_3$)Cl$_2$ (1.764 g) was then added into the flask in solid form over a period of 4 minutes. The slurry was stirred for 2 hours at ambient temperature. A 15 wt % Armostat-1800 in toluene solution (18.103 g) was added into the flask over a period of 3 minutes. The container was rinsed with toluene (3×5 mL), and the rinses were added in the flask. The slurry was further stirred at ambient temperature for 30 minutes. The catalyst slurry was poured into a fritted funnel, which was fitted onto a filter flask, and reduced pressure applied to the filter flask to separate the reaction solvent. Toluene (150 mL) was added to the filter cake and stirred with a spatula to obtain a well dispersed slurry. Reduced pressure was then applied to the filter flask to remove the wash solvent. Pentane (150 mL) was added to the filter cake and stirred with spatula to obtain a well dispersed slurry. Reduced pressure was then applied to the filter flask to remove wash solvent. A second pentane wash was done and reduced pressure applied to remove solvent until the filter cake appears to be dry. The filter cake was then transferred to a 2 L round-bottomed flask and the catalyst was dried by applying reduced pressure to the flask until 300 mTorr was obtained. The catalyst had 2.7 weight percent of Armostat-1800 present.

Catalysts B

Synthesis of (1-$C_6F_5CH_2$-Indenyl)((t-Bu)$_3$P=N)TiCl$_2$. To distilled indene (15.0 g, 129 mmol) in heptane (200 mL) was added BuLi (82 mL, 131 mmol, 1.6 M in hexanes) at room temperature. The resulting reaction mixture was stirred overnight. The mixture was filtered and the filter cake washed with heptane (3×30 mL) to give indenyllithium (15.62 g, 99% yield). Indenyllithium (6.387 g, 52.4 mmol) was added as a solid over 5 minutes to a stirred solution of $C_6F_5CH_2$—Br (13.65 g, 52.3 mmol) in toluene (100 mL) at room temperature. The reaction mixture was heated to 50° C. and stirred for 4 h. The product mixture was filtered and washed with toluene (3×20 mL). The combined filtrates were evaporated to dryness to afford 1-$C_6F_5CH_2$-indene (13.58 g, 88%). To a stirred slurry of TiCl$_4$.2THF (1.72 g, 5.15 mmol) in toluene (15 mL) was added solid (t-Bu)$_3$P=N—Li (1.12 g, 5 mmol) at room temperature. The resulting reaction mixture was heated at 100° C. for 30 min and then allowed to cool to room temperature. This mixture containing ((t-Bu)$_3$P=N)TiCl$_3$ (1.85 g, 5 mmol) was used in the next reaction. To a THF solution (10 mL) of 1-$C_6F_5CH_2$-indene (1.48 g, 5 mmol) cooled at −78° C. was added n-butyllithium (3.28 mL, 5 mmol, 1.6 M in hexanes) over 10 minutes. The resulting dark orange solution was stirred for 20 minutes and then transferred via a double-ended needle to a toluene slurry of ((t-Bu)$_3$P=N)TiCl$_3$ (1.85 g, 5 mmol). The cooling was removed from the reaction mixture which was stirred for a further 30 minutes. The solvents were evaporated to afford a yellow pasty residue. The solid was re-dissolved in toluene (70 mL) at 80° C. and filtered hot. The toluene was evaporated to afford pure (1-$C_6F_5CH_2$-Indenyl)((t-Bu)$_3$P=N)TiCl$_2$ (2.35 g, 74%).

Preparation of Supported Catalyst B1: Sylopol 2408 silica purchased from Grace Davison was calcined by fluidizing with air at 200° C. for 2 hours and subsequently with nitrogen at 600° C. for 6 hours. 398.5 g of the calcined silica was added to 1594 mL of toluene. 873.0 g of a MAO solution containing 4.5 weight % Al purchased from Albemarle was added to the silica slurry quantitatively. The mixture was stirred for 2 hours at ambient temperature. The stirring rate should be such so as not to break-up the silica particles. 8.825 g of (1-$C_6F_5CH_2$-Indenyl)((t-Bu)$_3$P=N)TiCl$_2$ (prepared as above) was weighed into a 500-mL Pyrex bottle and 176 mL of toluene added. The metal complex solution was added to the silica slurry quantitatively. The resulting slurry was stirred for 2 hours at ambient temperature. 83.81 g of 15 wt % toluene solution of Armostat® 1800 was weighed into a small vessel and transferred quantitatively to the silica slurry. The resulting mixture was stirred for a further 30 minutes after which the slurry was filtered, yielding a clear filtrate. The solid component was washed with toluene (2×300 mL) and then with pentane (2×750 mL). The final product was dried in vacuo to between 450 and 200 mtorr and stored under nitrogen until used. The finished catalyst had a pale yellow to pale orange colour. The catalyst had 2.7 wt % of Armostat present.

Preparation of Supported Catalyst B2. The preparation of this catalyst is similar to Catalyst B-1, except that 381.9 g of calcined silica, 1049.3 g of a MAO solution containing 4.5 wt % Al and 7.881 g of (1-$C_6F_5CH_2$-Indenyl)((t-Bu)$_3$P=N)TiCl$_2$ were used.

Polymerization

The Bench Scale Reactor (BSR) was a 2 liter autoclave semi batch reactor operating in the gas phase at 85° C. at 300 psig of total operating pressure. 1.0 mL of a 25 wt % solution of triisobutylaluminum (TIBAL) in heptane was used as an impurity scavenger prior to introduction of ethylene. Catalyst delivery and polymer removal were in batch mode, and all feed-streams delivery was continuous. The reactor was equipped with impeller stirrers that spin at 525 rpm to provide reactor mixing. The BSR was equipped with a process Gas Chromatograph that continuously measures the reactor headspace composition. A syringe pump delivered 1-hexene to the reactor and all other feed-streams were delivered via mass flow indicating controllers. The feed-streams responded to inputs from the master controller in a closed loop control system to maintain reaction set-points. Feed-stream control utilized cascaded proportional-integral-derivative (i.e., PID) loops for each of the reactor reagents (ethylene, 1-hexene, hydrogen and nitrogen). The operator entered the target mole % of each reagent into the Human Machine Interface. These values were what the primary or master loop utilized as the process set-point target and this was what the unit monitored via the feedback from the process GC analysis. The cascaded (slave) loop interpreted the output from the master loop as a molar ratio of the reagent concentration divided by ethylene concentration. This reagent molar ratio varied during the reaction in relation to the GC analysis output concentrations in the master loop and thereby maintained reagent set-points in the master loop.

Pressure control of the reactor was done by the use of a single PID loop where input to the loop was in the form of the observed reactor pressure. The loop output controlled the flow of only ethylene to the reactor to maintain the set pressure. As described above, all of the other reaction components are fed in ratio to the ethylene and are therefore subject to the constraints of pressure control.

General Conditions: The reactor was heated at 100° C. for 1 hour and thoroughly purged with nitrogen. A polymerization catalyst (prepared as above) was loaded into a catalyst injection tube in an inert atmosphere glove box. The catalyst injection tube was attached to the reactor, and the reactor was purged once with ethylene and four times with nitrogen. Ethylene partial pressure was maintained at 50 mol % in the reactor. 1-Hexene partial pressure was maintained at 0.8 mol %. Hydrogen flow was adjusted to the ethylene flow such that the partial pressure was maintained at approximately 0.025 mol % and the balance of the reactor mixture (approximately 49 mol %) was nitrogen. The run was continued for 60 to 100 minutes, before the ethylene flow was stopped. Cooling water was turned on and the gases were slowly vented from the reactor. The reactor was then purged with nitrogen. The reactor was then opened so that the reactor contents, the reactor internal and the polymer could be observed.

The molar ratio of 1-hexene to ethylene present in the reactor was monitored using an on-line gas chromotagraph (GC) and controlled using a PID logic control system. The "variability" in the molar ratio of Cx/C2 is herein defined as the percent standard deviation from the average Cx/C2 molar ratio as discussed above. Variability then is given by the equation for finding the standard deviation, $\sqrt{[\Sigma(X-X^{ave})^2/(n-1)]}$ where X is the molar ratio of Cx/C2, $X^{ave}$ is the average molar ratio of Cx/C2, and n is the sample size, followed by dividing the standard deviation by the average molar ratio of Cx/C2 value and multiplying by 100.

A similar, but more rudimentary control was performed for the molar ratio of hydrogen/ethylene. In this case the ratio of hydrogen/ethylene was controlled manually using feedback from an on-line gas phase chromatograph (GC). The "variability" in the molar ratio of H2/C2 is found in the same way as the variability in Cx/C2.

Example 1

In this example, an ethylene copolymer having a melt index ($I_2$) of 0.62 g/10 min and a density of 0.921 g/cm³ was made under "tight" process control using supported Catalyst A1. That is, the variability (i.e. percent standard deviation from average) in the molar ratio of 1-hexene/ethylene was maintained, as controlled by a PID control system, within 3.3% from a targeted average of 0.0260. The variability in the molar ratio of hydrogen/ethylene was roughly 12.6% of the targeted average of 0.000337. The ethylene copolymer was analyzed by GPC-FTIR and the results are shown in FIG. 1.

Example 2

In this example, an ethylene copolymer having a melt index ($I_2$) of 0.58 g/10 min and a density of 0.9167 g/cm³ was made under "loose" process control using Catalyst A1. That is, the variability (i.e., the percent standard deviation from average) in the molar ratio of 1-hexene/ethylene from the average was allowed to drift, as controlled by a PID control system, by 8.6% from a targeted average of 0.0295. The standard deviation in the ratio of hydrogen/ethylene was roughly 13.1% of the targeted average of 0.000259. The ethylene copolymer was analyzed by GPC-FTIR and the results are shown in FIG. 2.

Figure 2:
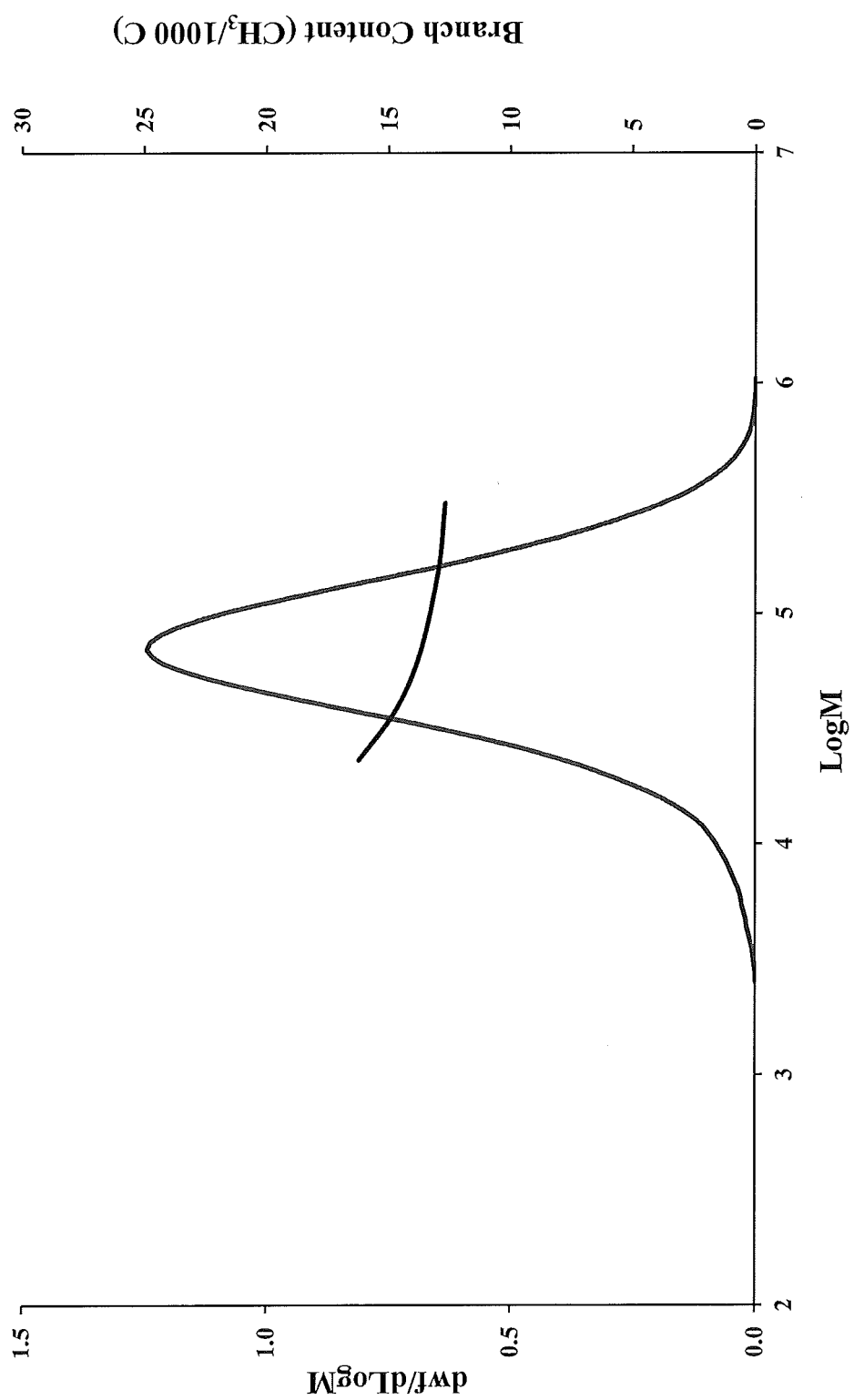
FIG. 2 shows a gel permeation chromatograph with Fourier transform infra-red (GPC-FTIR) detection obtained for an ethylene copolymer made according to an embodiment of the present disclosure. The comonomer content, shown as the number of short chain branches per 1000 carbons (y-axis), is given relative to the copolymer molecular weight (x-axis). The downwardly sloping line (from left to right) is the short chain branching (in short chain branches per 1000 carbons atoms) determined by FTIR. As can be seen in the figure, the number of short chain branches decreases at higher molecular weights, and hence the comonomer incorporation is said to be "normal".

It is clear from a comparison of FIGS. 1 and 2, that when the control over the Cx/C2 ratio is tight (e.g., standard deviation as a percentage of the average is less than about 5%) the comonomer content increases as molecular weight increases and hence the ethylene copolymer produced has a reversed comonomer distribution profile. Conversely, a comparison of FIGS. 1 and 2 also shows that when the control of the Cx/C2 ratio is loose (e.g., standard deviation as a percentage of the average is greater than about 5%) the comonomer content decreases as molecular weight increases and hence the ethylene copolymer produced has a normal comonomer distribution profile. Note that the H2 variability was similar in both examples 1 and 2, and so the above results mainly demonstrate the effect of changing the variability of the Cx/C2 molar ratio in the polymerization reactor.

Without wishing to be bound by theory, a person skilled in the art would recognize that smaller changes in the comonomer distribution profile (for example, from reversed to approximately flat, or vice versa) could be realized by using varying degrees of control over the Cx/C2 ratio. The above examples show that the distribution of comonomer within the ethylene copolymer can be altered by changing polymerization conditions from a first set of conditions in which the ratio of Cx/C2 is tightly maintained about a target average Cx/C2 ratio to a second set of conditions in which the ratio of Cx/C2 is allowed to vary from a target average Cx/C2 ratio, and vice versa. Further, a person skilled in the art would recognize that the terms "tight" and "loose" are used arbitrarily herein and that different catalyst systems and polymerization processes may require different levels of variability in the Cx/C2 molar ratio to effect a desired comonomer distribution profile (e.g., reversed, partially reversed, approximately flat, normal etc.).

Examples 3, 4, 5 and 6

Figure 3:
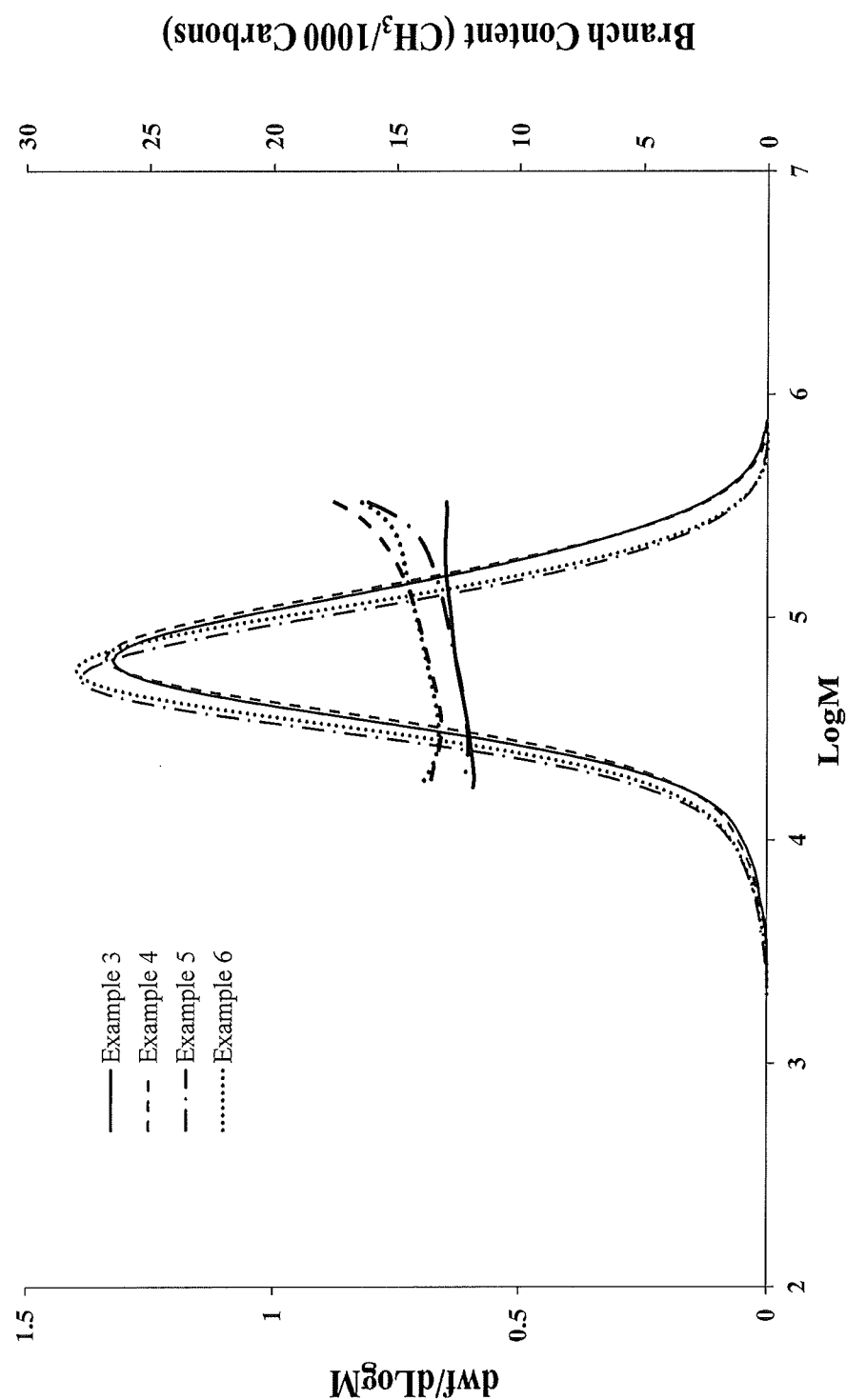
FIG. 3 shows a gel permeation chromatograph with Fourier transform infra-red (GPC-FTIR) detection obtained for ethylene copolymers made according to various embodiments of the present disclosure. The comonomer content, shown as the number of short chain branches per 1000 carbons (y-axis), is given relative to the copolymer molecular weight (x-axis).

In these examples an ethylene copolymer was made under conditions of changing variability in the Cx/C2 and the H2/C2 molar ratios using supported Catalyst A2. Examples 3 through 6 were carried out at 85° C. The process control data along with corresponding polymer data are shown Table 1. In addition, FIG. 3 shows how changes in the variability of the Cx/C2 and H2/C2 molar ratios lead to changes in the slope of the comonomer distribution in the resulting ethylene copolymers.

TABLE 1

| Ex. No. | Productivity (g poly/g cat) | $I_2$ | $I_{21}/I_2$ | Density (g/cm³) | Mw | Mw/Mn | Std Dev. as % of average C6/C2 | Average C6/C2 | Std Dev. as % of average H2/C2 | Average H2/C2 | Br(Mz)/Br(Mn) determined by GPC-FTIR[1] |
|---|---|---|---|---|---|---|---|---|---|---|---|
| 3 | 3240 | 0.78 | 15.8 | 0.9167 | 112097 | 1.99 | 10.6 | 0.0370 | 19.4 | 0.000266 | 1.041 |
| 4 | 1978 | 0.71 | 19.6 | 0.9143 | 110001 | 1.87 | 4.8 | 0.0330 | 3.65 | 0.000289 | 1.086 |
| 5 | 2583 | 1.08 | 17.8 | 0.9171 | 96958 | 1.86 | 4.8 | 0.0278 | 11.3 | 0.000286 | 1.065 |
| 6 | 2274 | 0.96 | 17.0 | 0.9158 | 98326 | 1.90 | 6.25 | 0.0305 | 5.2 | 0.000303 | 1.065 |

NOTE
[1]Calculated as the number of short chain branches per 1000 carbon atoms at the polymer Mz divided by the number of short chain branches per 1000 carbon atoms at the polymer Mn.
Note
[2]A lower target hydrogen value in reactor (0.0136 vs. 0.0140 mol %)

The data provided in Table 1 and FIG. 3 show that when the variability in the 1-hexene/ethylene and hydrogen/ethylene molar ratios are relatively large as is the case for Example 3 (e.g., the percent standard deviation in the 1-hexene/-ethylene molar ratio is 10.6% of the average 1-hexene/ethylene molar ratio and the percent standard deviation in the hydrogen/ethylene molar ratio is 19.4% of the average hydrogen/ethylene molar ratio) the slope of the 1-hexene comonomer distribution is at its lowest (e.g., Br(Mz)/Br(Mn)=1.041). Alternatively, the data also show that when the variability in the 1-hexene/ethylene and hydrogen/ethylene molar ratios are relatively small as is the case in Example 4 (e.g., the percent standard deviation in the 1-hexene/ethylene molar ratio is 4.8% of the average 1-hexene/ethylene molar ratio and the percent standard deviation in the hydrogen/ethylene molar ratio is 3.65% of the average hydrogen/ethylene molar ratio) the slope of the 1-hexene comonomer distribution is at its highest (e.g., Br(Mz)/Br(Mn)=1.086). Examples 5 and 6 show that intermediate variability in the in the 1-hexene/ethylene and hydrogen/ethylene molar ratios lead to products having intermediate slopes for comonomer distribution (e.g., Br(Mz)/Br(Mn)=1.065).

Examples 7, 8 and 9

In these examples an ethylene copolymer was made under conditions of changing variability in the Cx/C2 and the H2/C2 molar ratios using supported Catalyst B1 or B2. Example 7 was run at 85° C. while Examples 8 and 9 were carried out at 80° C. The process control data along with corresponding polymer data is shown Table 2. In addition, FIGS. 4, 5 and 6 which correspond to Examples 7, 8 and 9, respectively, show how the changes in variability of the Cx/C2 and H2/C2 molar ratios change the slope of the comonomer distribution in the resulting ethylene copolymers.

Figure 4:
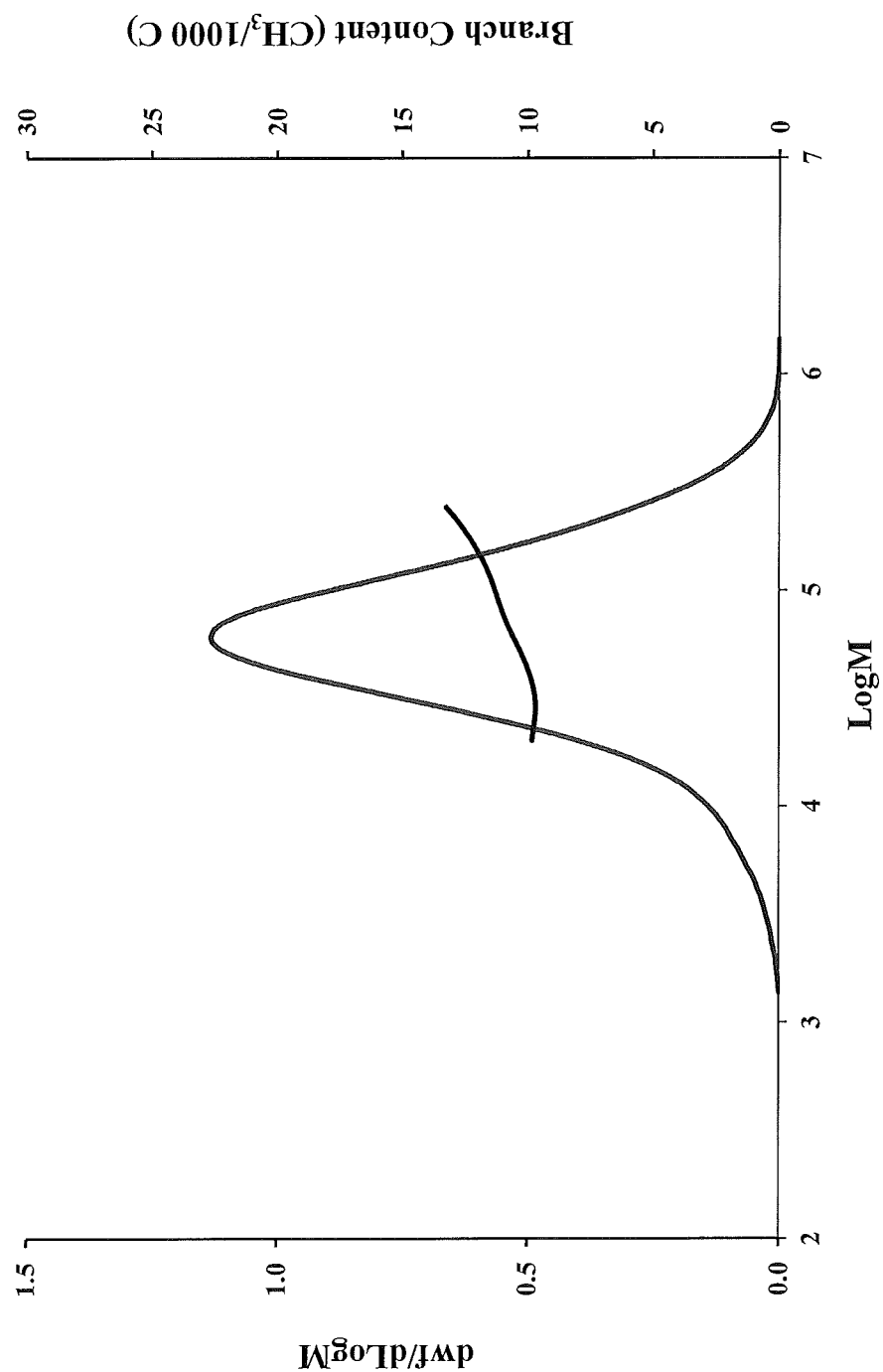
FIG. 4 shows a gel permeation chromatograph with Fourier transform infra-red (GPC-FTIR) detection obtained for an ethylene copolymer made according to an embodiment of the present disclosure. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the figure, the number of short chain branches increases at higher molecular weights, and hence the comonomer incorporation is said to be "reversed".
Figure 5:
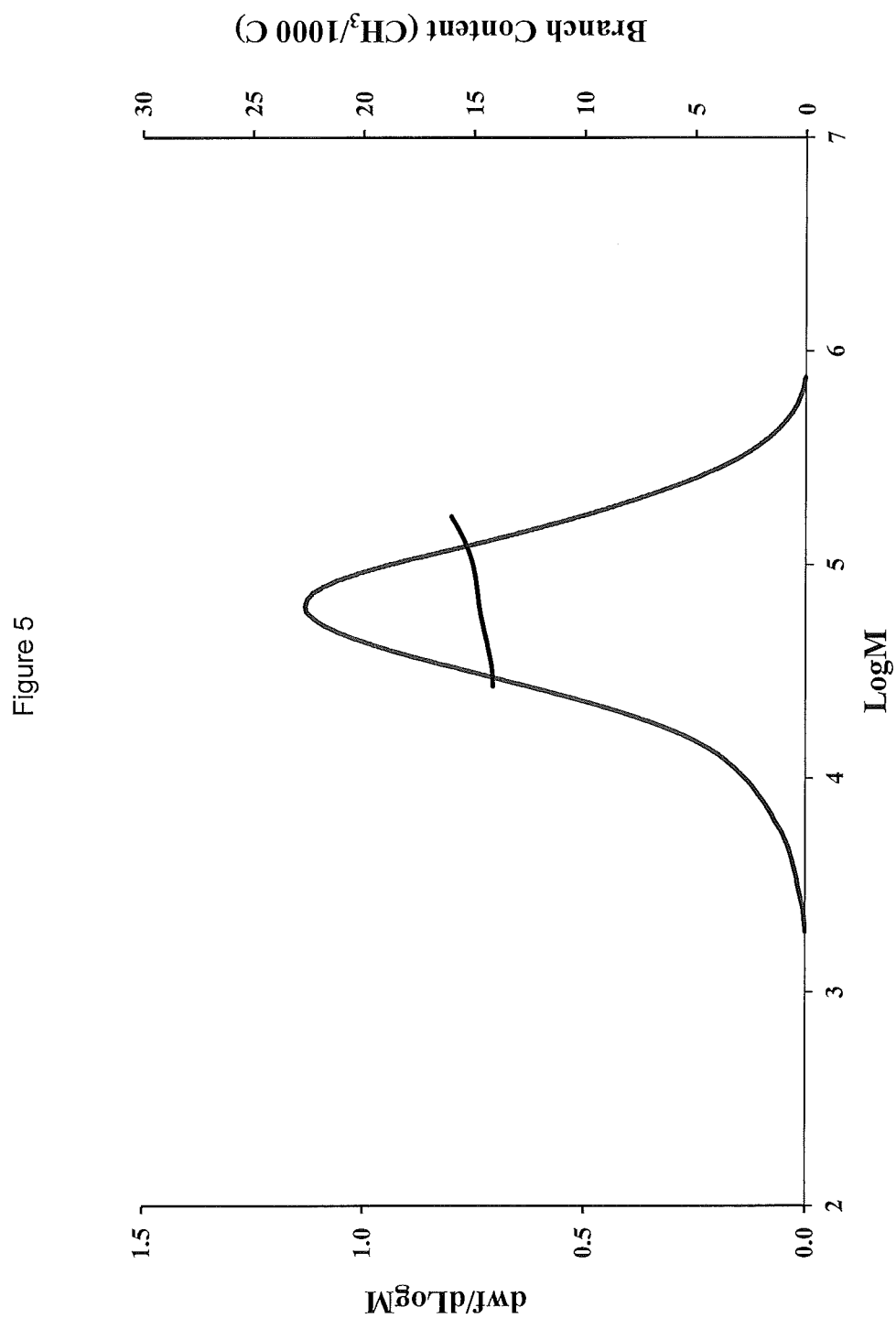
FIG. 5 shows a gel permeation chromatograph with Fourier transform infra-red (GPC-FTIR) detection obtained for an ethylene copolymer made according to an embodiment of the present disclosure. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the figure, the number of short chain branches increases at higher molecular weights, and hence the comonomer incorporation is said to be "reversed".
Figure 6:
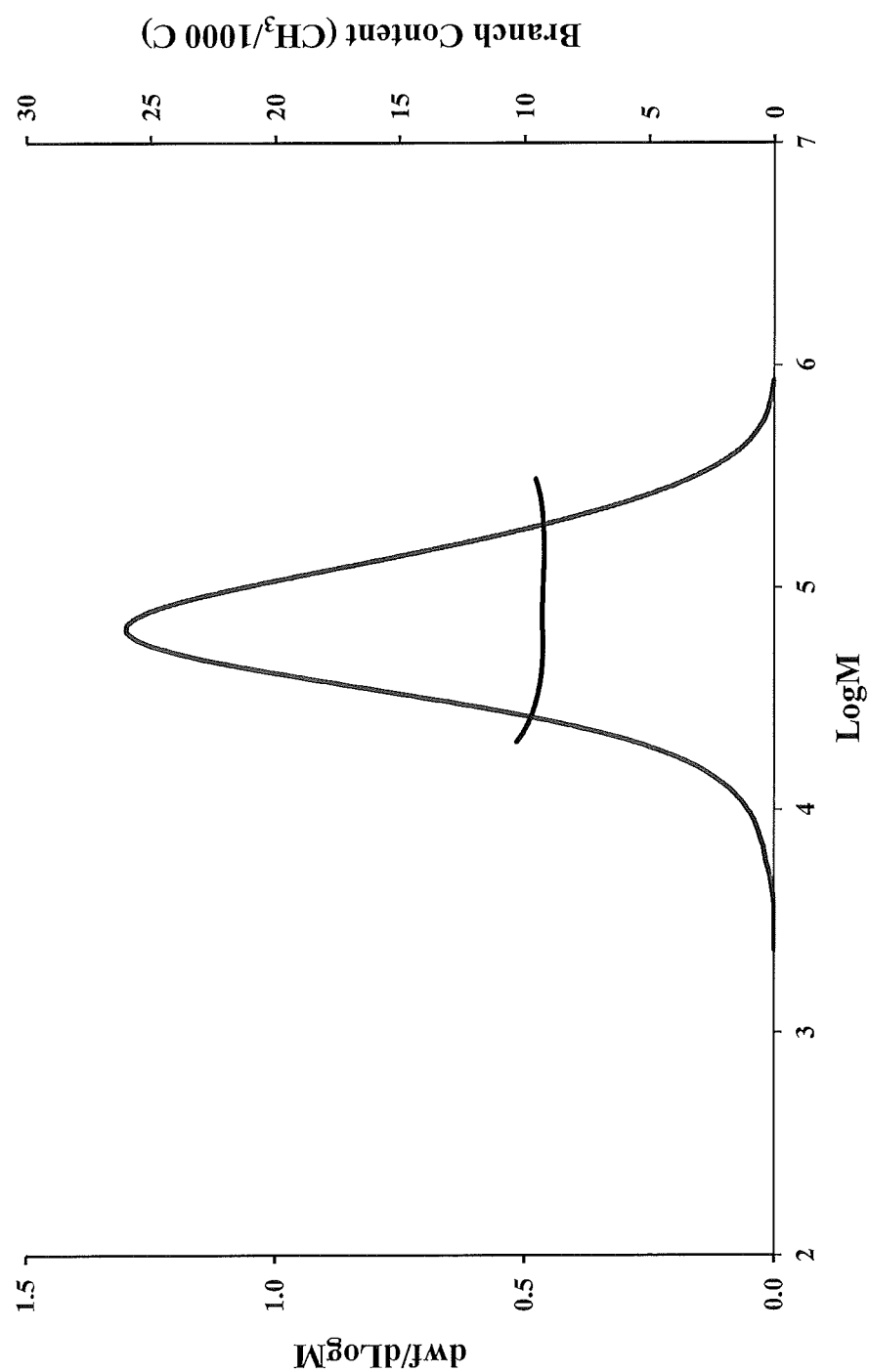
FIG. 6 shows a gel permeation chromatograph with Fourier transform infra-red (GPC-FTIR) detection obtained for an ethylene copolymer made according to an embodiment of the present disclosure. The comonomer content, shown as the number of short chain branches per 1000 carbons (y-axis), is given relative to the copolymer molecular weight (x-axis). The approximately flat line (from left to right) is the short chain branching (in short chain branches per 1000 carbons atoms) determined by FTIR. As can be seen in the figure, the number of short chain branches is approximately the same at lower and higher molecular weights, and hence the comonomer incorporation is said to be "flat" or "approximately flat".

The data provided in Table 2 as well as in FIGS. 4, 5 and 6 show that when the variability in the 1-hexene/ethylene molar ratio is relatively small as is the case for Example 7 (e.g., the percent standard deviation in the 1-hexene/ethylene molar ratio is 15.2% of the average 1-hexene/ethylene molar ratio) the slope of the 1-hexene comonomer incorporation is also relatively high (e.g., Br(Mz)/Br(Mn)=1.245) and the ethylene copolymer has a reversed comonomer distribution profile. The data further shows that when the percent standard deviation in the 1-hexene/ethylene molar ratio is increased to 19.6% and 27.6% of the average 1-hexene/ethylene molar ratio, as is the case in Examples 8 and 9 respectively, the slope of the 1-hexene comonomer incorporation decreases. Indeed, example 9 which has the highest variability in the 1-hexene/ethylene molar ratio has an approximately flat (or slightly negative) comonomer incorporation profile (e.g., Br(Mz)/Br(Mn)=0.993). The data in Table 2 also shows that at least with respect to catalyst B, there does not appear to be a strong correlation between the variability in the hydrogen/ethylene ratio and the comonomer distribution, or at least that it is not as strong as the effect of changing the variability in the 1-hexene/ethylene molar ratio.

The embodiments of the invention in which an exclusive property or privilege is claimed are defined as follows:
1. A method for altering the placement of comonomer in an ethylene copolymer, the method comprising
polymerizing ethylene (C2) and one or more comonomers (Cx) with a single site catalyst system under gas phase polymerization conditions and either
i) changing polymerization conditions from a first set of conditions in which the molar ratio of Cx/C2 is maintained within a 5% standard deviation from a target average Cx/C2 ratio to a second set of conditions in

TABLE 2

| Ex. No.[1] | Productivity (g poly/g catalyst) | $I_{21}$ | $I_{21}/I_2$ | Density (g/cm³) | Mw | Mw/Mn | Std Dev. as % of average C6/C2 | Aver. C6/C2 | Std Dev. as % of average H2/C2 | Aver. H2/C2 | Br(Mz)/Br(Mn) determined by GPC-FTIR[2] |
|---|---|---|---|---|---|---|---|---|---|---|---|
| 7 | 861 | 0.71 | 26.6 | 0.9230 | 104006 | 2.34 | 15.2 | 0.0217 | 26.5 | 0.000211 | 1.245 |
| 8 | 833 | 0.66 | 35.9 | 0.9182 | 89012 | 2.49 | 19.6 | 0.0221 | 5.0 | 0.000259 | 1.103 |
| 9 | 2374 | 0.72 | 17.4 | 0.9196 | 120798 | 1.99 | 27.6 | 0.0226 | 17.0 | 0.000250 | 0.993 |

NOTE
[1]Examples 7 and 9 are carried out using catalyst B1. Example 8 is carried out using catalyst B2.
NOTE
[2]Calculated as the number of short chain branches per 1000 carbon atoms at the polymer Mz divided by the number of short chain branches per 1000 carbon atoms at the polymer Mn.

which the molar ratio of Cx/C2 varies beyond a 5% standard deviation of the target average Cx/C2 ratio respectively; or ii) changing polymerization conditions from a first set of conditions in which the molar ratio of Cx/C2 varies beyond a 5% standard deviation from a target average Cx/C2 ratio to a second set of conditions in which the molar ratio of Cx/C2 is maintained within a 5% standard deviation from the target average Cx/C2 ratio respectively.

2. The method of claim 1 wherein the density of the ethylene copolymer changes by less than 0.005 g/cm$^3$.

3. The method of claim 1 wherein the density of the ethylene copolymer changes by less than 0.003 g/cm$^3$.

4. The method of claim 1 wherein the comonomer Cx is selected from 1-butene, 1-hexene and 1-octene.

5. The method of claim 1 wherein the single site catalyst system comprises a phosphinimine catalyst, a catalyst activator and a support.

* * * * *